(12) United States Patent
Scapa et al.

(10) Patent No.: US 10,685,055 B2
(45) Date of Patent: Jun. 16, 2020

(54) HASHTAG-PLAYLIST CONTENT SEQUENCE MANAGEMENT

(71) Applicant: Altair Engineering, Inc., Troy, MI (US)

(72) Inventors: James R. Scapa, West Bloomfield, MI (US); Stephanie A. Scapa, San Mateo, CA (US)

(73) Assignee: Altair Engineering, Inc., Troy, MI (US)

( * ) Notice: Subject to any disclaimer, the term of this patent is extended or adjusted under 35 U.S.C. 154(b) by 0 days.

(21) Appl. No.: 15/915,921

(22) Filed: Mar. 8, 2018

(65) Prior Publication Data

US 2018/0196806 A1    Jul. 12, 2018

Related U.S. Application Data

(63) Continuation-in-part of application No. 14/862,229, filed on Sep. 23, 2015.

(51) Int. Cl.
*G06F 17/30* (2006.01)
*H04L 12/58* (2006.01)
(Continued)

(52) U.S. Cl.
CPC ........ *G06F 16/435* (2019.01); *G06F 16/4387* (2019.01); *G06F 16/48* (2019.01);
(Continued)

(58) Field of Classification Search
None
See application file for complete search history.

(56) References Cited

U.S. PATENT DOCUMENTS

| 4,754,426 A | 6/1988 | Rast et al. |
| 4,937,863 A | 6/1990 | Robert et al. |

(Continued)

FOREIGN PATENT DOCUMENTS

| CN | 102356397 | 2/2012 |
| EP | 1862202 | 12/2007 |

(Continued)

OTHER PUBLICATIONS

CN Office Action for CN App No. 201080012394.2 dated Nov. 1, 2013 (8 pages).

(Continued)

*Primary Examiner* — Natisha D Cox
(74) *Attorney, Agent, or Firm* — Fish & Richardson P.C.

(57) ABSTRACT

Hashtag-playlist content sequence management may include receiving a hashtag-playlist generation request message including a hashtag-playlist indicator and a first content curator indicator, storing hashtag-playlist information indicating an association between the hashtag-playlist indicator and the first content curator indicator, receiving a request for a sequence of content, wherein the request for the sequence of content includes the hashtag-playlist indicator, generating the sequence of content by identifying hashtag-playlist content objects, wherein each respective content object from the hashtag-playlist content objects is identified based on information indicating a defined association between the respective content object and the hashtag-playlist identifier, and including at least one content object from the hashtag-playlist content objects in the sequence of content, and transmitting at least one content object from the sequence of content for presentation to a user associated with the user account.

16 Claims, 26 Drawing Sheets

(51) Int. Cl.
*G06F 16/435* (2019.01)
*G06F 16/48* (2019.01)
*G06F 16/438* (2019.01)
*G06F 16/68* (2019.01)

(52) U.S. Cl.
CPC ............ *G06F 16/686* (2019.01); *H04L 51/10* (2013.01); *H04L 51/32* (2013.01); *H04L 51/02* (2013.01)

(56) References Cited

U.S. PATENT DOCUMENTS

| | | |
|---|---|---|
| 5,204,897 A | 4/1993 | Wyman |
| 5,260,999 A | 11/1993 | Wyman |
| 5,390,297 A | 2/1995 | Barber et al. |
| 5,438,508 A | 8/1995 | Wyman |
| 5,579,222 A | 11/1996 | Bains et al. |
| 5,606,493 A | 2/1997 | Duscher et al. |
| 5,634,080 A | 5/1997 | Kikinis et al. |
| 5,671,412 A | 9/1997 | Christiano |
| 5,742,813 A | 4/1998 | Kavanagh et al. |
| 5,745,879 A | 4/1998 | Wyman |
| 5,752,041 A | 5/1998 | Fosdick |
| 5,758,069 A | 5/1998 | Olsen |
| 5,758,257 A | 5/1998 | Herz et al. |
| 5,790,664 A | 8/1998 | Coley |
| 5,835,910 A | 11/1998 | Kavanagh et al. |
| 5,905,860 A | 5/1999 | Olsen et al. |
| 5,920,861 A | 7/1999 | Hall |
| 5,931,901 A | 8/1999 | Wolfe et al. |
| 5,966,444 A | 10/1999 | Yuan et al. |
| 5,973,683 A | 10/1999 | Cragun et al. |
| 5,990,883 A | 11/1999 | Byrne et al. |
| 6,009,401 A | 12/1999 | Horstman |
| 6,020,883 A | 2/2000 | Herz et al. |
| 6,026,387 A | 2/2000 | Kesel |
| 6,029,176 A | 2/2000 | Cannon |
| 6,038,591 A | 3/2000 | Wolfe et al. |
| 6,049,332 A | 4/2000 | Boetje et al. |
| 6,049,789 A | 4/2000 | Frison et al. |
| 6,088,722 A | 7/2000 | Herz et al. |
| 6,101,606 A | 8/2000 | Diersch |
| 6,118,492 A | 9/2000 | Milnes et al. |
| 6,133,909 A | 10/2000 | Schein et al. |
| 6,141,754 A | 10/2000 | Choy |
| 6,160,570 A | 12/2000 | Sitnik |
| 6,161,137 A | 12/2000 | Ogdon et al. |
| 6,161,142 A | 12/2000 | Wolfe et al. |
| 6,169,992 B1 | 1/2001 | Beall et al. |
| 6,173,269 B1 | 1/2001 | Solokl et al. |
| 6,182,050 B1 | 1/2001 | Ballard |
| 6,198,906 B1 | 3/2001 | Boetje et al. |
| 6,219,652 B1 | 4/2001 | Carter et al. |
| 6,240,415 B1 | 5/2001 | Blumberg |
| 6,256,664 B1 | 7/2001 | Donoho et al. |
| 6,262,721 B1 | 7/2001 | Tsukidate et al. |
| 6,263,362 B1 | 7/2001 | Donoho et al. |
| 6,263,501 B1 | 7/2001 | Schein et al. |
| 6,275,844 B1 | 8/2001 | Rail |
| 6,286,140 B1 | 9/2001 | Ivanyi |
| 6,317,881 B1 | 11/2001 | Shah-Nazaroff et al. |
| 6,324,519 B1 | 11/2001 | Eldering |
| 6,411,941 B1 | 6/2002 | Mullor et al. |
| 6,473,794 B1 | 10/2002 | Guheen et al. |
| 6,502,079 B1 | 12/2002 | Ball |
| 6,502,124 B1 | 12/2002 | Shimakawa et al. |
| 6,519,571 B1 | 2/2003 | Guheen et al. |
| 6,536,037 B1 | 3/2003 | Guheen et al. |
| 6,574,612 B1 | 6/2003 | Baratti et al. |
| 6,591,244 B2 | 7/2003 | Jim et al. |
| 6,606,744 B1 | 8/2003 | Mikurak |
| 6,615,166 B1 | 9/2003 | Guheen et al. |
| 6,671,818 B1 | 12/2003 | Mikurak |
| 6,721,713 B1 | 4/2004 | Guheen et al. |
| 6,728,766 B2 | 4/2004 | Cox et al. |
| 6,732,106 B2 | 5/2004 | Okamoto et al. |
| 6,816,882 B1 | 11/2004 | Conner et al. |
| 6,859,792 B1 | 2/2005 | Marjadi et al. |
| 6,889,206 B1 | 5/2005 | Nuttall |
| 6,948,070 B1 | 9/2005 | Ginter |
| 6,957,186 B1 | 10/2005 | Guheen et al. |
| 6,966,832 B2 | 11/2005 | Leen et al. |
| 7,013,294 B1 | 3/2006 | Sekigawa et al. |
| 7,036,091 B1 | 4/2006 | Nguyen |
| 7,124,101 B1 | 10/2006 | Mikurak |
| 7,130,807 B1 | 10/2006 | Mikurak |
| 7,139,737 B2 | 11/2006 | Takahashi et al. |
| 7,165,041 B1 | 1/2007 | Guheen et al. |
| 7,194,439 B2 | 3/2007 | Kassan et al. |
| 7,203,966 B2 | 4/2007 | Abburi et al. |
| 7,209,900 B2 | 4/2007 | Hunter et al. |
| 7,225,165 B1 | 5/2007 | Kyojima |
| 7,231,370 B1 | 6/2007 | Kapur |
| 7,299,209 B2 | 11/2007 | Collier |
| 7,313,512 B1 | 12/2007 | Traut et al. |
| 7,315,826 B1 | 1/2008 | Guheen et al. |
| 7,343,365 B2 | 3/2008 | Farnham |
| 7,395,245 B2 | 7/2008 | Okamoto et al. |
| 7,590,601 B2 | 9/2009 | Shea et al. |
| 7,630,986 B1 | 12/2009 | Herz |
| 7,672,972 B1 | 3/2010 | Maijadi et al. |
| 7,716,077 B1 | 5/2010 | Mikurak |
| 7,788,272 B2 | 8/2010 | Ray |
| 7,809,648 B2 | 10/2010 | Misra |
| 7,818,350 B2 | 10/2010 | New et al. |
| 7,859,551 B2 | 12/2010 | Bulman |
| 7,898,648 B2 | 3/2011 | Ophey et al. |
| 8,032,409 B1 | 10/2011 | Mikurak |
| 8,073,780 B2 | 12/2011 | Marjadi |
| 8,126,938 B2 | 2/2012 | Cohen |
| 8,340,796 B2 | 12/2012 | Stefik |
| 8,392,505 B2 | 3/2013 | Haughay, Jr. et al. |
| 8,504,932 B2 | 8/2013 | Quek et al. |
| 8,831,998 B1 | 9/2014 | Cramer |
| 8,943,425 B2 | 1/2015 | Wickramasuriya et al. |
| 9,065,824 B1 | 6/2015 | Valdivia |
| 9,135,580 B1 | 9/2015 | Lyman |
| 9,678,637 B1* | 6/2017 | Brothers ............... G06F 3/0484 |
| 9,712,587 B1 | 7/2017 | Alfishawi et al. |
| 10,120,983 B2 | 11/2018 | Smith, II et al. |
| 10,230,673 B1 | 3/2019 | Lewis |
| 2001/0010046 A1 | 7/2001 | Muyres |
| 2001/0011253 A1 | 8/2001 | Coley |
| 2001/0013024 A1 | 8/2001 | Takahashi et al. |
| 2001/0037404 A1 | 11/2001 | Hafsteinsson |
| 2002/0007298 A1 | 1/2002 | Jim et al. |
| 2002/0029347 A1 | 3/2002 | Edelman |
| 2002/0046181 A1 | 4/2002 | Story, Jr. |
| 2002/0049679 A1 | 4/2002 | Russell et al. |
| 2002/0059094 A1 | 5/2002 | Hosea et al. |
| 2002/0069263 A1 | 6/2002 | Sears et al. |
| 2002/0091568 A1 | 7/2002 | Kraft et al. |
| 2002/0120564 A1 | 8/2002 | Strietzel |
| 2002/0129356 A1 | 9/2002 | Hellerstein et al. |
| 2002/0156824 A1 | 10/2002 | Armstrong |
| 2002/0161908 A1 | 10/2002 | Benitez |
| 2002/0183045 A1 | 12/2002 | Emmerson et al. |
| 2002/0194589 A1 | 12/2002 | Cristofalo et al. |
| 2003/0036683 A1 | 2/2003 | Kehr et al. |
| 2003/0046578 A1 | 3/2003 | Brown |
| 2003/0059022 A1 | 3/2003 | Nebiker et al. |
| 2003/0069766 A1 | 4/2003 | Hoffman et al. |
| 2003/0084165 A1 | 5/2003 | Kjellberg et al. |
| 2003/0135380 A1 | 7/2003 | Lehr et al. |
| 2003/0135474 A1 | 7/2003 | Circenis et al. |
| 2003/0144903 A1 | 7/2003 | Brechner |
| 2003/0182142 A1 | 9/2003 | Valenzuela et al. |
| 2003/0208763 A1 | 11/2003 | McElhatten et al. |
| 2004/0122774 A1 | 6/2004 | Studd et al. |
| 2005/0033613 A1 | 2/2005 | Patullo |
| 2005/0049931 A1 | 3/2005 | Wisnudel et al. |
| 2005/0182731 A1 | 8/2005 | Marjadi et al. |
| 2006/0004668 A1 | 1/2006 | Hamnen et al. |
| 2006/0020556 A1 | 1/2006 | Hamnen |

(56) References Cited

U.S. PATENT DOCUMENTS

| | | |
|---|---|---|
| 2006/0073820 A1 | 4/2006 | Craswell et al. |
| 2006/0106728 A1 | 5/2006 | Yellai et al. |
| 2006/0143236 A1 | 6/2006 | Wu |
| 2006/0248017 A1 | 11/2006 | Koka et al. |
| 2006/0259930 A1 | 11/2006 | Rothschild |
| 2006/0287959 A1 | 12/2006 | Blecken |
| 2006/0294019 A1 | 12/2006 | Dayan et al. |
| 2007/0016599 A1 | 1/2007 | Plastina |
| 2007/0106622 A1 | 5/2007 | Boomershine et al. |
| 2007/0219923 A1 | 9/2007 | Shea et al. |
| 2007/0226150 A1 | 9/2007 | Pietrzak et al. |
| 2007/0226155 A1 | 9/2007 | Yu et al. |
| 2007/0233578 A1 | 10/2007 | Fusz et al. |
| 2007/0233837 A1 | 10/2007 | Imai |
| 2007/0244826 A1 | 10/2007 | Wang |
| 2007/0277233 A1 | 11/2007 | Bodin et al. |
| 2007/0299845 A1 | 12/2007 | Tokunaga |
| 2008/0005032 A1 | 1/2008 | Znidarsic |
| 2008/0015888 A1 | 1/2008 | Dang |
| 2008/0064493 A1 | 3/2008 | Andersson |
| 2008/0071689 A1 | 3/2008 | Tabet |
| 2008/0080552 A1 | 4/2008 | Gates et al. |
| 2008/0082450 A1 | 4/2008 | Grimm et al. |
| 2008/0083025 A1 | 4/2008 | Meijer et al. |
| 2008/0154798 A1 | 6/2008 | Valz |
| 2008/0178284 A1 | 7/2008 | Harwell |
| 2008/0208692 A1 | 8/2008 | Garaventi |
| 2008/0228533 A1 | 9/2008 | McGuire et al. |
| 2008/0228689 A1 | 9/2008 | Tewary et al. |
| 2008/0235116 A1 | 9/2008 | Jensen |
| 2008/0250349 A1 | 10/2008 | Peiro et al. |
| 2008/0288542 A1 | 11/2008 | Buttars |
| 2008/0319910 A1 | 12/2008 | Duffus et al. |
| 2009/0003712 A1 | 1/2009 | Mei et al. |
| 2009/0048860 A1 | 2/2009 | Brotman et al. |
| 2009/0094159 A1 | 4/2009 | Cunningham |
| 2009/0132435 A1 | 5/2009 | Titus et al. |
| 2009/0150343 A1 | 6/2009 | English |
| 2009/0240629 A1 | 9/2009 | Xie et al. |
| 2009/0287513 A1 | 11/2009 | Anderson |
| 2009/0327437 A1 | 12/2009 | Estrada |
| 2010/0017725 A1 | 1/2010 | McCarthy et al. |
| 2010/0114531 A1 | 5/2010 | Korn |
| 2010/0185656 A1 | 7/2010 | Pollard |
| 2010/0186066 A1 | 7/2010 | Pollard |
| 2010/0217613 A1 | 8/2010 | Kelly |
| 2010/0223677 A1 | 9/2010 | Scapa |
| 2010/0228679 A1 | 9/2010 | Scapa |
| 2010/0251181 A1 | 9/2010 | Lal |
| 2011/0047566 A1 | 2/2011 | Matuchniak |
| 2011/0113133 A1 | 5/2011 | Kelly |
| 2011/0213681 A1 | 9/2011 | Shahid |
| 2011/0239131 A1 | 9/2011 | Koren |
| 2012/0022954 A1 | 1/2012 | Garcia et al. |
| 2012/0041812 A1 | 2/2012 | Postrel |
| 2012/0066089 A1 | 3/2012 | Henderson |
| 2012/0173975 A1 | 7/2012 | Herz et al. |
| 2012/0185389 A1 | 7/2012 | Rose |
| 2012/0226978 A1 | 9/2012 | Harberts et al. |
| 2012/0246734 A1 | 9/2012 | Pride et al. |
| 2012/0251080 A1 | 10/2012 | Svendsen |
| 2012/0272185 A1 | 10/2012 | Dodson |
| 2012/0296681 A1 | 11/2012 | Fitzgerald |
| 2012/0317198 A1 | 12/2012 | Patton |
| 2013/0042262 A1 | 2/2013 | Riethmueller |
| 2013/0054279 A1 | 2/2013 | Sharp |
| 2013/0138426 A1 | 5/2013 | DelRocco |
| 2013/0145385 A1* | 6/2013 | Aghajanyan ........... G06Q 30/02 725/10 |
| 2013/0166649 A1* | 6/2013 | Atzmon .................. H04L 67/22 709/204 |
| 2013/0179680 A1 | 7/2013 | Peterka |
| 2013/0185656 A1 | 7/2013 | Heikes et al. |
| 2013/0246916 A1 | 9/2013 | Reimann et al. |
| 2013/0311768 A1 | 11/2013 | Fosmark |
| 2013/0332395 A1 | 12/2013 | Kim et al. |
| 2013/0339362 A1 | 12/2013 | Yang |
| 2013/0339397 A1 | 12/2013 | Herasymchuk |
| 2014/0208391 A1 | 7/2014 | Farnsworth |
| 2014/0222775 A1 | 8/2014 | Zahar et al. |
| 2014/0278968 A1 | 9/2014 | Strompolos |
| 2014/0280079 A1* | 9/2014 | Jain ..................... G06F 16/9535 707/723 |
| 2014/0280899 A1 | 9/2014 | Brewster, Jr. |
| 2014/0379705 A1* | 12/2014 | Zureiqat .............. G11B 27/329 707/723 |
| 2014/0379729 A1 | 12/2014 | Savage |
| 2015/0051925 A1 | 2/2015 | Yudin et al. |
| 2015/0074413 A1 | 3/2015 | Hao |
| 2015/0088668 A1 | 3/2015 | Bruce |
| 2015/0117631 A1 | 4/2015 | Tuchman |
| 2015/0120357 A1 | 4/2015 | Tuchman |
| 2015/0193600 A1 | 7/2015 | Matsuda |
| 2015/0302321 A1 | 10/2015 | Scapa et al. |
| 2015/0310354 A1 | 10/2015 | Mahalingam et al. |
| 2015/0310513 A1 | 10/2015 | Fariello et al. |
| 2015/0346928 A1 | 12/2015 | MacArthur |
| 2015/0379118 A1 | 12/2015 | Wickenkamp |
| 2016/0057473 A1 | 2/2016 | Mitchell |
| 2016/0092780 A1* | 3/2016 | Kelley ................ H04L 65/4076 709/219 |
| 2016/0253710 A1 | 9/2016 | Publicover |
| 2016/0297398 A1 | 10/2016 | Jefferies |
| 2016/0359816 A1 | 12/2016 | Vedula |
| 2017/0295119 A1 | 10/2017 | Rosenberg |
| 2017/0300456 A1 | 10/2017 | Rimmer |
| 2017/0339081 A1 | 11/2017 | Beust |
| 2018/0046944 A1 | 2/2018 | Barbera |
| 2018/0124105 A1 | 5/2018 | Rodrigues |
| 2018/0349641 A1 | 12/2018 | Barday |
| 2019/0215344 A1 | 7/2019 | Barday |
| 2019/0222476 A1 | 7/2019 | McEntee |
| 2019/0332803 A1 | 10/2019 | Barday |

FOREIGN PATENT DOCUMENTS

| | | |
|---|---|---|
| EP | 2409258 | 1/2012 |
| EP | 2414954 | 2/2012 |
| JP | 2002091595 | 3/2002 |
| JP | 2005250635 | 9/2005 |
| JP | 2007286703 | 1/2007 |
| JP | 2007265193 | 10/2007 |
| KR | 20010095908 | 11/2001 |
| KR | 101185968 | 9/2012 |
| WO | WO1992020021 | 11/1992 |
| WO | WO2010108006 | 9/2010 |
| WO | WO2010115107 | 10/2010 |
| WO | WO 2012048086 | 4/2012 |

OTHER PUBLICATIONS

EP Suppl Search Report for EP App No. 10759478.0 dated Apr. 18, 2013 (5 pages).

International Search Report for Intl App No. PCT /US2010/029787 dated Nov. 2, 2010 (3 pages).

JP Office Action for JP 2012-503741 dated Jan. 20, 2014 (4 pages).

U.S. Appl. No. 14/862,229, filed Sep. 23, 2015, Scapa, James.

"Altair Releases HyperWorks 9.0 Connecting Engineerings with New Solver Technology and to the Global Grid: Newest version of Altair's simulation platform delivers on-demand access to the ISV applications and offers multi-core licensing business model" Anonymous. PR Newswire [New York] May 19, 2008 downloaded from ProQuestDirect on the Internet (3 pages).

Brignall, Miles, "Peugeot launches car club with a difference" The Guardian Jul. 9, 2010 retrieved from: http://www. guardian.co.uk/money/Jul. 10, 2010/peugeot-car-club-mu/print on Oct. 4, 2011 (4 pages).

Extended European Search Report in co-pending European Application No. 10754111.2 dated Aug. 14, 2012 (5 pages).

International Preliminary Report on Patentability dated Oct. 13, 2011 from the corresponding International Patent Application No. PCT/US2010/029787.

(56) References Cited

OTHER PUBLICATIONS

International Preliminary Report on Patentability dated Sep. 29, 2011 from the corresponding International Patent Application No. PCT/US2010/027820.
International Search Report and the Written Opinion of the International Searching Authority (ISA/KR) dated Dec. 27, 2012 from corresponding International Application No. PCT/US2011/055060 filed Oct. 6, 2011.
International Search Report and Written Opinion dated Oct. 26, 2010 from the corresponding International Patent Application No. PCT/US2010/027820.
Levine, Mark, "Share My Ride" The New York Times Mar. 8, 2009 retrieved from: http://www.ny limes.com/2009/03/08/magazine/ 08Zipcar-l.html?pagewanted=print on Oct. 4, 2011 (8 pages).
ZIPCAR "is zipcar for me" retrieved from: http://www.zipcar.com/ is-il/ on Oct. 4, 2011 (2 pages).
ZIPCAR "rates & plans" retrieved from: http://www.zipcar.com/ allanta/check-rates on Oct. 4, 2011 (2 pages).

* cited by examiner

HASHTAG-PLAYLIST CONTENT SEQUENCE MANAGEMENT

CROSS-REFERENCE TO RELATED APPLICATION(S)

This application is a Continuation-In-Part of U.S. application Ser. No. 14/862,229, filed on Sep. 23, 2015, the entire disclosure of which is hereby incorporated by reference.

TECHNICAL FIELD

The present disclosure relates to systems and methods of accessing digital content.

BACKGROUND

Digital content such as computer software products, video games, music, and any other media capable of being embodied in digital format may be sold or licensed to an end user customer. Accordingly, it may be desirable to provide contextual curated content sequence management, which may include contextual curated content sequence management under unit-based licensing.

SUMMARY

Disclosed herein are aspects, features, elements, implementations, and embodiments of contextual curated content sequence management.

In an embodiment, a method of hashtag-playlist content sequence management may include receiving, at a first device from a second device via a first electronic communication link, a hashtag-playlist generation request message, the hashtag-playlist generation request message including a hashtag-playlist indicator and a first content curator indicator, the hashtag-playlist indicator identifying a hashtag-playlist, and the first content curator indicator indicating a first content curator. Hashtag-playlist content sequence management may include in response to a determination that a previously generated hashtag-playlist corresponding to the hashtag-playlist indicator is unavailable, storing, by a processor of the first device in response to instructions stored on a non-transitory computer readable medium of the first device, hashtag-playlist information indicating an association between the hashtag-playlist indicator and the first content curator indicator, wherein storing the hashtag-playlist information includes generating the hashtag-playlist information. Hashtag-playlist content sequence management may include receiving, at the first device from a third device via a second electronic communication link, a request for a sequence of content, wherein the request for the sequence of content includes the hashtag-playlist indicator and a user account indicator identifying a user account. Hashtag-playlist content sequence management may include generating, by the processor in response to the instructions stored on the non-transitory computer readable medium, the sequence of content. Generating the sequence of content may include identifying hashtag-playlist content objects, wherein each respective content object from the hashtag-playlist content objects is identified based on information indicating a defined association between the respective content object and the hashtag-playlist identifier, and including at least one content object from the hashtag-playlist content objects in the sequence of content. Hashtag-playlist content sequence management may include transmitting at least one content object from the sequence of content for presentation to a user associated with the user account.

In another embodiment, an apparatus for hashtag-playlist content sequence management is disclosed. The apparatus comprises a server device including a memory and a processor, wherein the memory includes instructions executable by the processor to for hashtag-playlist content sequence management. The processor may be configured to execute the instructions to receive, from an external device via a first electronic communication link, a hashtag-playlist generation request message, the hashtag-playlist generation request message including a hashtag-playlist indicator and a first content curator indicator, the hashtag-playlist indicator identifying a hashtag-playlist, and the first content curator indicator indicating a first content curator. The processor may be configured to execute the instructions to in response to a determination that a previously generated hashtag-playlist corresponding to the hashtag-playlist indicator is unavailable, store hashtag-playlist information indicating an association between the hashtag-playlist indicator and the first content curator indicator, wherein storing the hashtag-playlist information includes generating the hashtag-playlist information. The processor may be configured to execute the instructions to receive, from a third device via a second electronic communication link, a request for a sequence of content, wherein the request for the sequence of content includes the hashtag-playlist indicator and a user account indicator identifying a user account, and generate the sequence of content by identifying hashtag-playlist content objects, wherein each respective content object from the hashtag-playlist content objects is identified based on information indicating a defined association between the respective content object and the hashtag-playlist identifier, and including at least one content object from the hashtag-playlist content objects in the sequence of content. The processor may be configured to execute the instructions to transmit at least one content object from the sequence of content for presentation to a user associated with the user account.

In another embodiment, a non-transitory computer-readable storage medium is disclosed. The non-transitory computer-readable storage medium includes program instructions executable by one or more processors that, when executed, cause the one or more processors to perform operations for hashtag-playlist content sequence management. Hashtag-playlist content sequence management may include receiving, at a first device from a second device via a first electronic communication link, a hashtag-playlist generation request message, the hashtag-playlist generation request message including a hashtag-playlist indicator and a first content curator indicator, the hashtag-playlist indicator identifying a hashtag-playlist, and the first content curator indicator indicating a first content curator. Hashtag-playlist content sequence management may include in response to a determination that a previously generated hashtag-playlist corresponding to the hashtag-playlist indicator is unavailable, storing, by a processor of the first device in response to instructions stored on a non-transitory computer readable medium of the first device, hashtag-playlist information indicating an association between the hashtag-playlist indicator and the first content curator indicator, wherein storing the hashtag-playlist information includes generating the hashtag-playlist information. Hashtag-playlist content sequence management may include receiving, at the first device from a third device via a second electronic communication link, a request for a sequence of content, wherein the request for the sequence of content includes the hashtag-playlist indicator and a user account indicator identifying a user account. Hashtag-playlist content sequence management may include generating, by the processor in response to the instructions stored on the non-transitory computer readable medium, the sequence of content. Generating the sequence of content may include identifying hashtag-playlist content objects, wherein each respective content object from the hashtag-playlist content objects is identified based on information indicating a defined association between the respective content object and the hashtag-playlist identifier, and including at least one content object from the hashtag-playlist content objects in the sequence of content. Hashtag-playlist content sequence management may include transmitting at least one content object from the sequence of content for presentation to a user associated with the user account.

Implementations of the subject matter described herein can provide one or more technical benefits. In some implementations, computer systems can exchange digital content more efficiently and effectively across a communications network. For instance, a computer system can automatically generate and exchange playlists of digital content based on a user's preferences (e.g., based on specific attributes of the digital content, the user's preferences, and/or the playlists), and automatically regulate access to the digital content by the user's device (e.g., using a computerized license management system). As the playlist is tailored to a particular user's preferences, the playlist is more likely to contain digital content that is relevant to the user. Thus, computer systems can more provide digital content in a more effective manner. Further, as the user is presented with relevant digital content, the user is less likely to "skip" or "cancel" playlist of particular digital content items (e.g., due to low relevance). Accordingly, the exchange of data between a content provider system and the user's device is made more efficient.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
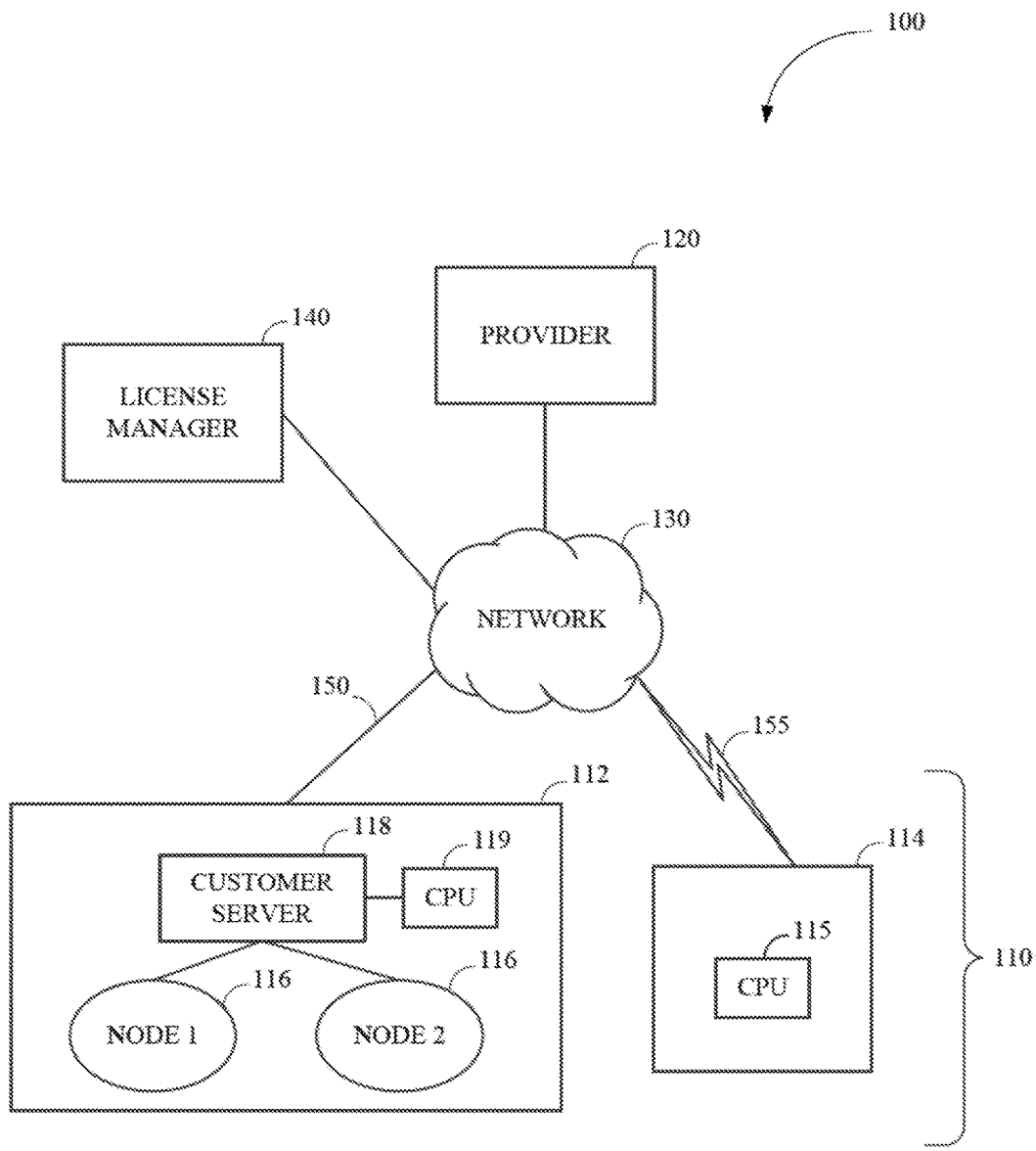
FIG. 1 is a diagram of an example of a communication system for contextual curated content sequence management in accordance with embodiments of this disclosure.

A user may access content, such as digital content, via a device, such as a smartphone or a personal computer. Content may be organized and accessed via content sequences, such as stations, playlists, or hashtag-playlists (#playlist). In some embodiments, a portion of a content sequence, such as a station, may be generated based on similarity to an identified content object.

The aspects, features, elements, and embodiments of methods, procedures, or algorithms disclosed herein, or any part or parts thereof, may be implemented in a computer program, software, or firmware incorporated in a non-transitory computer-readable storage medium for execution by a computer or processor, such as a special purpose computer or processor, and may be implemented as a computer program product, such as a computer program product accessible from a tangible computer-usable or computer-readable medium.

As used herein, the terminology "computer" or "device" includes any unit, or combination of units, capable of performing any method, or any portion or portions thereof, disclosed herein. Devices may further include mobile devices that may include user equipment, a wireless transmit/receive unit, a mobile station, a fixed or mobile subscriber unit, a pager, a cellular telephone, a personal digital assistant (PDA), a computer, or any other type of user device capable of operating in a mobile environment.

As used herein, the terminology "processor" includes a single processor or multiple processors, such one or more special purpose processors, one or more digital signal processors, one or more microprocessors, one or more controllers, one or more microcontrollers, one or more Application Specific Integrated Circuits (ASICs), one or more Application Specific Standard Products (ASSPs); one or more Field Programmable Gate Arrays (FPGAs) circuits, any other type or combination of integrated circuits (ICs), one or more state machines, or any combination thereof.

As used herein, the terminology "memory" includes any computer-usable or computer-readable medium or device that can, for example, tangibly contain, store, communicate, or transport any signal or information for use by or in connection with any processor. Examples of computer-readable storage mediums may include one or more read only memories, one or more random access memories, one or more registers, one or more cache memories, one or more semiconductor memory devices, one or more magnetic media, such as internal hard disks and removable disks, one or more magneto-optical media, one or more optical media such as CD-ROM disks, and digital versatile disks (DVDs), or any combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terminology "digital content" may include computer software programs, video games, music, movies, videos, or any other media that may be embodied in digital form, and which may be accessed, downloaded, input, or otherwise transferred to a computer or processor. Digital content may include digital data or digital files that may be processed by external application programs or may be executed by external software, hardware, or both. As used herein, the terminology "content" may include live content or fixed content. Fixed content may include any content that may be presented from a tangible storage medium, such as digital content. Live content may include any content that may be accessed substantially concurrently with the creation or generation of the content, such as the presentation of a movie in a movie theater, a concert, a sporting event, or any other live event.

As used herein, the terminology "event" may include any presentation, distribution, or display of content capable of concurrent, or nearly concurrent, access by multiple users. For example, an event may include a physical presentation, such a presentation at a movie theater, concert hall, park, venue, museum, or restaurant, or a virtual presentation, such as a broadcast over the Internet or a television broadcast.

As used herein, the terminology "access" or "accessing" may include presenting, downloading, executing, streaming, or otherwise interacting, or enabling interaction, with a digital content object or event. In some embodiments, digital content objects may be executed, stored, or both, at a provider location. In some embodiments, digital content objects may be stored locally on a customer network or customer device and the digital content objects may be executed or run on the customer network or device.

In some embodiments, accessing content using for contextual curated content sequence management may include unit-based licensing. A creator or owner of content, such as digital content, may control access to the content by licensing the content to end users. For example, licensing may include controlling the right to access content, which may include controlling the right to display, perform, distribute, or reproduce the content. Unit-based licensing may include licensing that controls access to content by allocating licensing units to a customer account, such that one or more licensing units may be redeemed or charged to access one or more events or digital content objects. For example, in some embodiments, provider, such as a content provider, may redeem licensing units and provide content in response to a request for access by a customer.

In some embodiments, a node based license may indicate that content is accessible by a unique device, such as a computer, a unique account, such as an account associated with an individual user, or a combination of a unique device and a unique account. In some embodiments, a network based license may indicate that content is accessible by one or more devices within a specified network. For example, a defined number of devices within the network may concurrently access the content. In some embodiments, a license, including a node based license or a network based license, may be associated with a unique content object or event, or with a suite of related content objects and events.

As used herein, the terminology "assigned units", "price", "licensing price" or variations thereof, may include an assigned number of licensing units that may be exchanged or redeemed to access a particular event or digital content object. As used herein, the terminology "licensed units" or "allocated units" may refer to a total number of units provided to a customer or customer group. As used herein, the terminology "checked out units", "redeemed units", or "exchanged units" may refer to assigned units charged to a customer for events or digital content being accessed. "Available units" may refer to a difference between licensed units and checked out units. In some embodiments, licensing units may be temporarily or permanently exchanged for access. Temporarily exchanged licensing units may be returned to the pool of available units associated with the customer upon termination or completion of content access. Returned units may be included in the available units allocated to the customer and may be redeemed for access to other events or digital content.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a communication system 100 for contextual curated content sequence management in accordance with embodiments of this disclosure. For simplicity, the communication system 100 shown in FIG. 1 includes a customer system 110, a provider 120, a communication network 130, and a license manager 140; however, other elements, such as multiple networks, access points, or communication mediums may be included in a communication system for contextual curated content sequence management.

In some embodiments, customer system 110 may be associated with an individual user or customer, and the user may access events or digital content using licensing units allocated to the user or to an account representing the user. In some embodiments, customer system 110 may comprise devices and networks through which a customer or user may access content, such as digital content, from the provider 120, or register for, or access, events. For example, as shown in FIG. 1, customer system 110 may include a customer network 112 and a customer device 114; however, any number of customer networks and customer devices may be used.

In some implementations, customer system 110 may be associated with a collection or group of customers, or members, and shared licensing units may be allocated to the group. For example, a group may include one or more families, a classroom of students, a small business, a social group, or any other organization capable of licensing events or digital content such that members of the group are capable of accessing the events or digital content.

In some embodiments, elements of the customer system 110, such as customer network 112 and customer device 114, may communicate with each other or with elements external to the customer system 110, such as the provider 120. For example, customer network 112 and customer device 114 may independently communicate through communication network 130.

In some embodiments, customer device 114 may be any device, such as a computer or mobile device, capable of accessing digital content. In some embodiments, a customer device 114 may include a processor, such as CPU 115.

In some embodiments, customer network 112 may include one or more individual nodes 116, a customer server 118, a host processor (CPU) 119, or any combination thereof. A node 116 may be a device, such as a computer, and may access digital content. For example, a node 116 may access digital content in response to user input. Although FIG. 1 includes two nodes 116 for simplicity, any number of nodes may be used. In some embodiments, a node 116 may be connected to a customer server 118 and may have a unique network address. In some embodiments, a node 116 may communicate with other nodes 116 within customer network 112. The customer server 118 may communicate with CPU 119. Although individual nodes 116 are depicted as being connected in a spoke configuration to the customer server 118, the individual nodes 116 may be connected in any other electronic computer network configuration. Although shown as separate units, in some embodiments, customer server 118 and CPU 119 may be combined into a single device.

In some embodiments, the provider 120 may be a device or system configured to provide access to digital content to one or more licensed customers. For example, the provider 120 may include an Internet Protocol (IP) network-based unit, such as a web site service, that implements methods for controlling access to events or digital content. In some embodiments, the provider 120 may provide customer system 110 access to digital content objects, which may be included in a suite of digital content. In some embodiments, the provider 120 may be any system configured to control access to or registration for events by licensed customers. Although FIG. 1 shows the a provider 120 as a single unit, the provider 120 may include any number of discrete units and any number of providers 120 may be used.

In some embodiments, the provider 120 may be distinct from a content provider. The content provider may own or otherwise control access to the content, and the provider 120 may provide access to the content on behalf of the content provider.

In some embodiments, the provider 120 may include an event provider (not shown separately) and may control access to or registration for one or more events. The event provider may be any system configured to receive a request to access or register for an event and output a response indicating whether access or registration is granted. In some embodiments, the request for access may include a request to register for the event, which may include receiving registration information. In some embodiments, the event provider may be the provider 120. In some embodiments, event provider may be separate from the provider 120. Although shown as a single unit in FIG. 1, in some embodiments, the provider 120 may include a provider as a first unit and the event provider as a second unit. For example, the provider and the event provider may be independent units within a single physical device, or may be independent physical devices.

In some implementations, contextual curated content sequence management may include communication between the customer system 110 and the provider 120 via the communication network 130. The communication network 130 may be a local area network (LAN), wide area network (WAN), virtual private network (VPN), a mobile or cellular telephone network, the Internet, or any other electronic communication medium. Although not explicitly shown in FIG. 1, each of the customer system 110, the provider 120, and license manager 140 may communicate with communication network 130 through one or more Internet service providers (ISPs). In some embodiments, the customer network 112, the customer device 114, or both, may communicate with the communication network 130 via a wired connection 150, a wireless connection 155, or a combination of one or more wired or wireless connections.

In some embodiments, a license manager 140 may be included in the communication system 100. License manager 140 may control the access to events, digital content, or both, provided by the provider 120. Although shown as a separate unit, in some embodiments, license manager 140 may be incorporated with the provider 120, customer system 110, or both. In some embodiments, the license manager 140 may monitor content access for the customer system 110. For example, the license manager 140 may detect the termination or conclusion of access to content.

In some embodiments, license manager 140 may generate and maintain a log. The log may include a record of a number of available units that may be used by the customer system 110 at any given time. In some embodiments, the license manager 140 may update the log for each change of the available units for customer system 110. For example, the log may be updated to indicate a change in the available units in response to the accessing of events or digital content from the provider 120, the termination of the access of events or digital content, or a change in pricing of events or digital content being accessed by the customer. In some embodiments, the log may be a file, or database, stored in a memory in communication with the provider 120 or license manager 140.

Although not shown in FIG. 1, in some embodiments, communication system 100 may include a registration unit. In some embodiments, a registration unit may be a device, such as a computer. For example, the registration unit may be a kiosk physically located at an event location. In some embodiments, the registration unit may be configured to receive registration information. For example, the registration unit may include a user interface device, such as a keyboard or touchscreen, and may receive user input indicating registration information via the user input device. In some embodiments, the registration unit may communicate with a user device, such as customer device 114.

Although not shown separately in FIG. 1, in some embodiments, a device, such as customer device 114, may access content other than content licensed under unit-based licensing. For example, contextual curated content sequence management may omit unit-based licensing.

Figure 2:
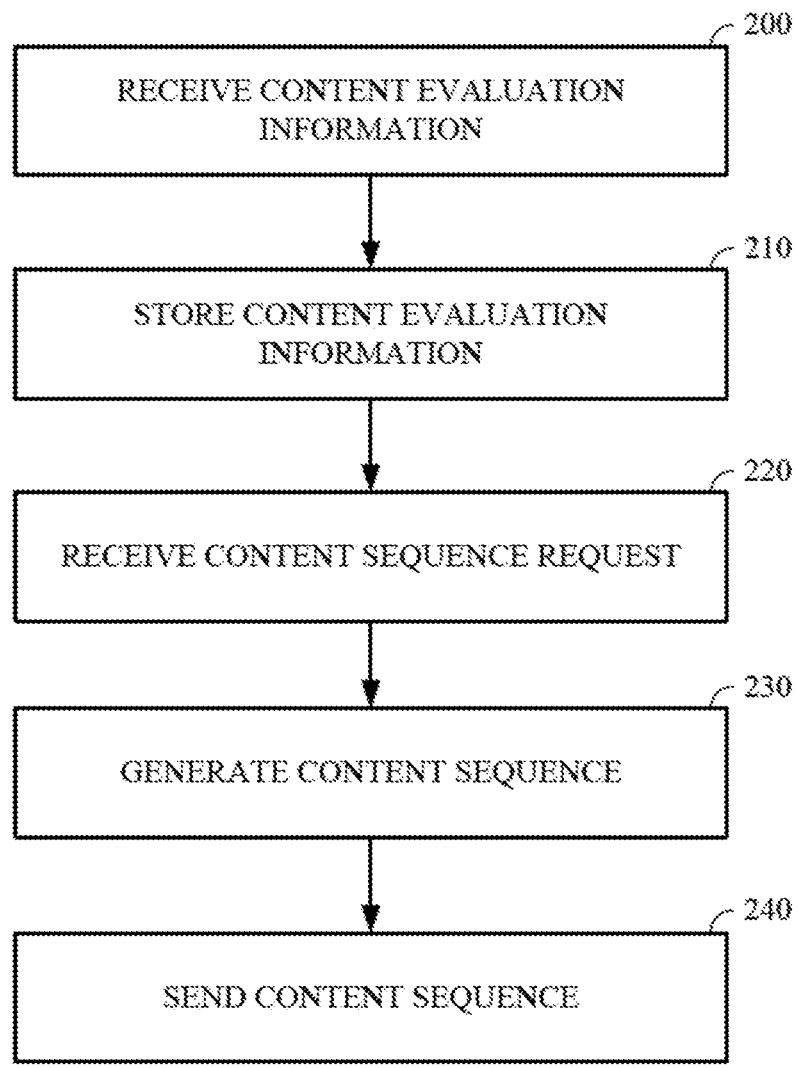
FIG. 2 is a flow diagram of an example of contextual curated content sequence management for digital content access in accordance with embodiments of this disclosure.

FIG. 2 is a flow diagram of an example of contextual curated content sequence management in accordance with embodiments of this disclosure. In some embodiments, contextual curated content sequence management may be implemented in a device, such as the customer device 114 shown in FIG. 1, which may communicate via a communication system, such as the Internet, or any other wired or wireless computer communication system or network.

In some embodiments, accessing content using contextual curated content sequence management may include receiving a content evaluation message at 200, storing content evaluation information at 210, receiving a content sequence request at 220, generating a content sequence at 230, transmitting the content sequence at 240, or a combination thereof.

In some embodiments, a content evaluation message may be received at 200. In some embodiments, a device, such as the customer device 114, shown in FIG. 1, may receive information indicating an evaluation for a content object within a context from a user of the device. For example, the device may receive input, such as user input, indicating the contextual evaluation information via a user interface presented to the user at the device. In some embodiments, the device may generate a content evaluation message, such as in response to receiving the contextual content evaluation information, and may transmit the content evaluation message to an external device, such as the provider 120, the license manager 140, or both, shown in FIG. 1, which may receive the message at 200.

In some embodiments, the contextual evaluation information may include a content object indicator, which may uniquely identify a content object, which may be a digital content object, such as a computer software program, a video game, music, a movie, or a video. In some embodiments, the contextual evaluation information may include a user indicator, which may identify the user of the device. In some embodiments, the contextual evaluation information may include a context indicator, which may indicate a context, such as an activity. For example, the context indicator may indicate working, cleaning, cooking, driving, partying, relaxing, studying, exercising, or any other defined context not directly identified by the content, within which the content may be accessed. In some embodiments, the contextual evaluation information may include an evaluation indicator, which may identify an evaluation, such as a positive evaluation, a negative evaluation, a scaled evaluation, or any other quantifiable subjective evaluation of the content object determined by the user for the context. In an example, the content may be music, such as a recording of a song, and the contextual evaluation information may indicate a positive assessment of the music within the context of exercising.

In some embodiments, receiving the content evaluation information at 200 may include receiving content evaluation information indicating ratings for multiple content objects within a context. In some embodiments, receiving the content evaluation information at 200 may include receiving content evaluation information indicating ratings for a content object within multiple contexts. For example, receiving the content evaluation information at 200 may include receiving content evaluation information indicating a positive evaluation for a song within an exercising context, and may include receiving content evaluation information indicating a negative evaluation for the song for use in a relaxing context.

In some embodiments, content evaluation information may be stored at 210. For example, a device, such as the customer device 114 shown in FIG. 1, the provider 120 shown in FIG. 1, the license manager 140 shown in FIG. 1, or a combination thereof, may store the content evaluation information. In some embodiments, storing the content evaluation information at 210 may include storing, such as in a record, information indicating the contextual evaluation information received at 200, which may include information indicating the evaluation, the content object, the context, or a combination thereof. In some embodiments, storing the content evaluation information at 210 may include storing information indicating a content curator associated with the evaluation. For example, the user indicated by the content evaluation message received at 200 may be identified as the content curator associated with the evaluation. In some embodiments, the content curator may indicate a group or type of user corresponding to the user indicated by the content evaluation message received at 200.

In some embodiments, a content sequence request may be received at 220. In some embodiments, a device, such as the customer device 114, shown in FIG. 1, may receive information indicating a request for a sequence of content from a user of the device. For example, the device may receive input, such as user input, indicating the request for the sequence of content via a user interface presented to the user at the device. In some embodiments, the device may transmit the request for the sequence of content to an external device, such as the provider 120, the license manager 140, or both, shown in FIG. 1, which may receive the message at 220. The device and user associated with generating the content evaluation information at 200 may be the same device and user as the device and user associated with generating the content sequence request at 220, or may be a different device, a different user, or a different device and a different user.

In some embodiments, the request for the sequence of content may include a context indicator, which may indicate a content type, such as music, movies, images, or any other type of digital content. In some embodiments, the request for the sequence of content may include a context indicator, which may indicate a context. In some embodiments, the request for the sequence of content may include a user indicator identifying the user that initiated the content sequence request. In some embodiments, the request for the sequence of content may include a curator indicator identifying a content curator. In some embodiments, the curator indicator may identify a user, a group of users, a type of users, or a user relationship.

In some embodiments, a content sequence, such as a station, playlist, or hashtag-playlist (#playlist), may be generated at 230. For example, a device, such as the customer device 114 shown in FIG. 1, the provider 120 shown in FIG. 1, the license manager 140 shown in FIG. 1, or a combination thereof, may generate the content sequence at 230 in response to receiving the content sequence request at 220.

Content sequences can be generated in a manner that improves the functionality of computerized systems for storing, transmitting, and regulating access to digital content (e.g., one or more of the components, devices, or systems shown in FIG. 1). As an example, computer systems can automatically generate and exchange content sequences (e.g., playlists of digital content) based on a user's preferences. Content sequences can be automatically generated, for instance, based on the specific attributes of the content items, the user's preferences, and/or the content sequences. Further, computer systems can automatically regulate access to specific content items by the user's device (e.g., using a computerized license management system). As the content sequences are tailored to a particular user's preferences, the content sequences are more likely to contain content that is relevant to the user. Thus, computer systems can more provide content in a more effective manner (e.g., by automatically identifying and providing personalized content, without manual intervention by a user). Further, as the user is presented with relevant content, the user is less likely to "skip" or "cancel" particular content items in the sequence (e.g., due to low relevance). Accordingly, the exchange of data between a content provider system and the user's device is made more efficient e.g., by reducing the likelihood of wasteful transmission of low-relevance content).

Example techniques, criteria, and rules for generating content sequences are described below.

In some embodiments, generating the content sequence at 230 may include identifying one or more content curators based on the content curator identifier indicated in the content sequence request received at 220. For example, the content sequence request may indicate a current user, may indicate a user relationship, such as following, and generating the content sequence at 230 may include identifying users that the current user is following as content creators for the request.

In some embodiments, generating the content sequence at 230 may include identifying available content, such as content available from the provider or content available for use by the current user.

In some embodiments, generating the content sequence at 230 may include identifying a previously generated content sequence generated based on the content curators for the context and updating the previously generated content sequence to include content based on positive evaluations received subsequent to generating the previously generated content sequence.

In some embodiments, curated content may be identified from the available content. The curated content may be identified based on content evaluation information associated with the content. For example, content evaluation information associated with an available content object may indicate that the content curator indicated by the content sequence request gave the content object a positive evaluation for use in the content indicated by the content sequence request, and the content object may be included in the curated content.

In some embodiments, a content object may be included in the curated content more than once. For example, the content curator indicated by the content sequence request may include multiple users, such as users followed by the user indicated by the content sequence request, content evaluation information associated with the content object may indicate positive evaluations for use in the content from more than one of the content curator users, and the content object may be included in the curated content once for each unique positive evaluation.

In some embodiments, some available content may be omitted from the curated content. For example, evaluation information generated by the content curator for the context may be unavailable for some content. In some embodiments, the available content omitted from the curated content may be identified as candidate content. In some embodiments, content associated with a negative evaluation by the content curator for the context may be omitted from the candidate content. In some embodiments, the candidate content may include content objects from the curated content.

In some embodiments, selected content may be automatically identified from the candidate content based on the curated content. For example, a content object from the candidate content may be similar to a content object from the curated content, and may be included in the selected content. In some embodiments, automatically identifying similar content may include determining a value of a similarity metric for each candidate content object. The value of the similarity metric may indicate a similarity between the candidate content object and one or more of the curated content objects. In some embodiments, a candidate content object that has a similarity metric value that exceeds a similarity threshold may be included in the selected content objects. In some embodiments, a candidate content object that has a similarity metric value that is within, such as less than or equal to, the similarity threshold may be omitted from the selected content objects. In some embodiments, other content may be included in the content sequence. For example, content may be identified and included in the content sequence based on one or more metrics other than the similarity metric, or random content may be included in the content sequence. In some embodiments, including the content in the content sequence may include determining a target ratio, such as sixty percent curated content, for including curated content relative to selected content, and including curated content and selected content based on the target ratio.

In some embodiments, content may be included in the content sequence. In some embodiments, the curated content, or a portion thereof, may be included in the content sequence. In some embodiments, the selected content, or a portion thereof, may be included in the content sequence. In some embodiments, the curated content, or a portion thereof, and the selected content, or a portion thereof, may be included in the content sequence. In some embodiments, the content included in the content sequence may be included in any order, such as a random order, a pseudo-random order, a temporal order based on content creation, a temporal order based on the corresponding positive evaluation, or any other order.

In some embodiments, identifying the curated content, the candidate content, the selected content, or a combination thereof may be omitted. For example, available content may be included in the content sequence, which may include, evaluating each content object, including content for which available content evaluation information indicates a positive evaluation by the content curator for the context, including automatically identified content similar to content for which available content evaluation information indicates a positive evaluation by the content curator for the context, or including a combination of positively rated curated content and automatically identified similar content.

In some embodiments, the content sequence may be transmitted at 240. For example, the content sequence may be generated by a provider, such as the provider 120 shown in FIG. 1, at 230 and may be transmitted, such as via a network, such as the communication network 130 shown in FIG. 1, to the user device that generated and sent the content sequence request received at 220.

In some embodiments, sending the content sequence at 240 may include identifying content from the content sequence, determining a cardinality of assigned units for the content, identifying a cardinality of available licensing units allocated to the user that requested the content sequence, determining that the cardinality of the assigned units is within the cardinality of the available licensing units, and sending the content. In some embodiments, the cardinality of the assigned units may exceed the cardinality of the available licensing units, and sending the content may be omitted.

In some embodiments, a user, a customer, or a group thereof accessing content using a shared pool of allocated licensing units, and the user, or group, may concurrently access multiple content objects. For example, a user may access a first content sequence via a first device and may concurrently access a second content sequence via a second device. In some embodiments, determining the cardinality of assigned units for multiple concurrently accessed content objects may include determining the cardinality of assigned units using stacking, leveling, or a combination thereof, such as weighted leveling.

Stacking may include identifying the cardinality of assigned units as a sum of a cardinality of assigned units for each concurrently accessed content object. For example, a first concurrently accessed content object may have a cardinality of assigned units of five, a second concurrently accessed content object may have a cardinality of assigned units of ten, and the cardinality of assigned units may be identified as 15 (5+10=15).

Leveling may include identifying the cardinality of assigned units as the maximum or peak cardinality of assigned units from among the cardinality of assigned units for each concurrently accessed content object. For example, a first concurrently accessed content object may have a cardinality of assigned units of five, a second concurrently accessed content object may have a cardinality of assigned units of ten, and the cardinality of assigned units may be identified as 10 (MAX[5, 10]=10).

In some embodiments, a combination of leveling licensing and stacking licensing, such as weighted leveling licensing, may be used. Weighted leveling licensing may include identifying a number, or cardinality, of assigned units for concurrently accessing content objects as a weighted average of the cardinality of assigned units for each of the concurrently accessed content object.

In some embodiments, a weight may be identified for weighted leveling licensing. For example, a first content object may have a cardinality of assigned units of five, a second concurrently accessed content object may have a cardinality of assigned units of ten, a weighted leveling licensing weight, such as eighty percent, may be identified, and the cardinality of assigned units may be identified based on the cardinality of assigned units for the first content object, the cardinality of assigned units for the second content object, and the weight, as 12 (0.8(5+10)=12).

In some embodiments, a weight may be identified for each concurrently accessed content object. For example, a first content object may have a cardinality of assigned units of five and a weight of eighty percent, a second concurrently accessed content object may have a cardinality of assigned units of ten and a weight of eighty percent, and the cardinality of assigned units may be identified as a sum of the weighted cardinality for the first content object and the weighted cardinality for the second content object, as 12 (0.8(5)+0.8(10)=12).

FIGS. 3-9 are diagrams of examples of portions of a user interface for contextual curated content sequence management, as shown in FIG. 2, in accordance with embodiments of this disclosure.

Figure 3:
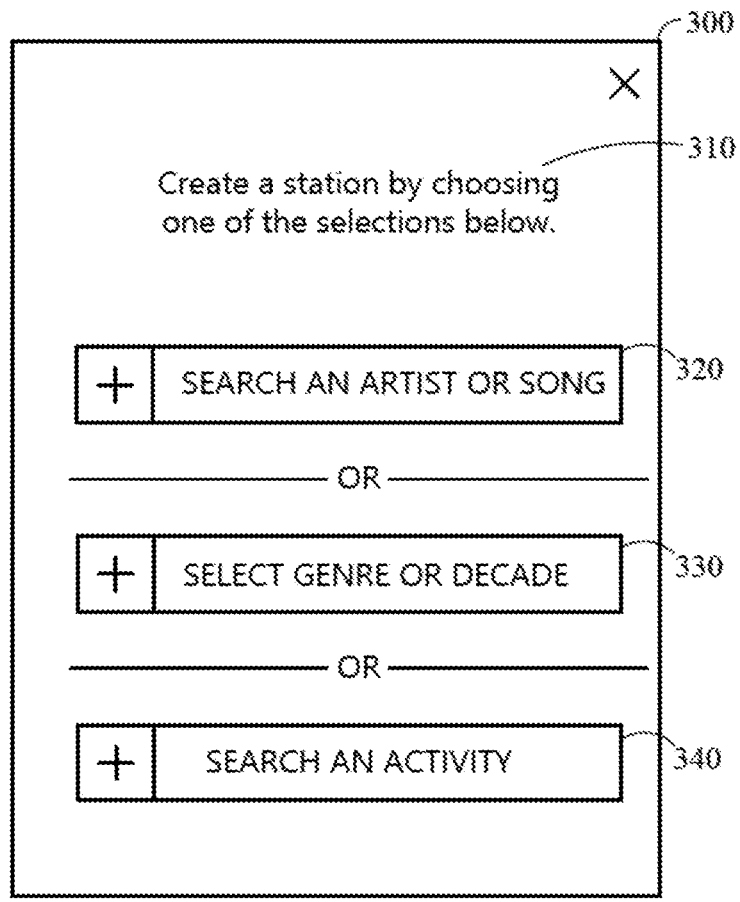
FIG. 3 is a diagram illustrating an example of a portion of a user interface for contextual curated content sequence management in accordance with embodiments of this disclosure.

FIG. 3 shows an example of a user interface 300 for initiating the generation of a content sequence request. As shown, the user interface 300 for initiating the generation of a content sequence request includes a descriptive portion 310, which describes the features and functions of the user interface 300 for initiating the generation of a content sequence request, and one or more controls 320, 330, 340. In some embodiments, the generation of a content sequence request may be initiated in response to input, such as user input, selecting the 'Search an Activity' control 340.

Figure 4:
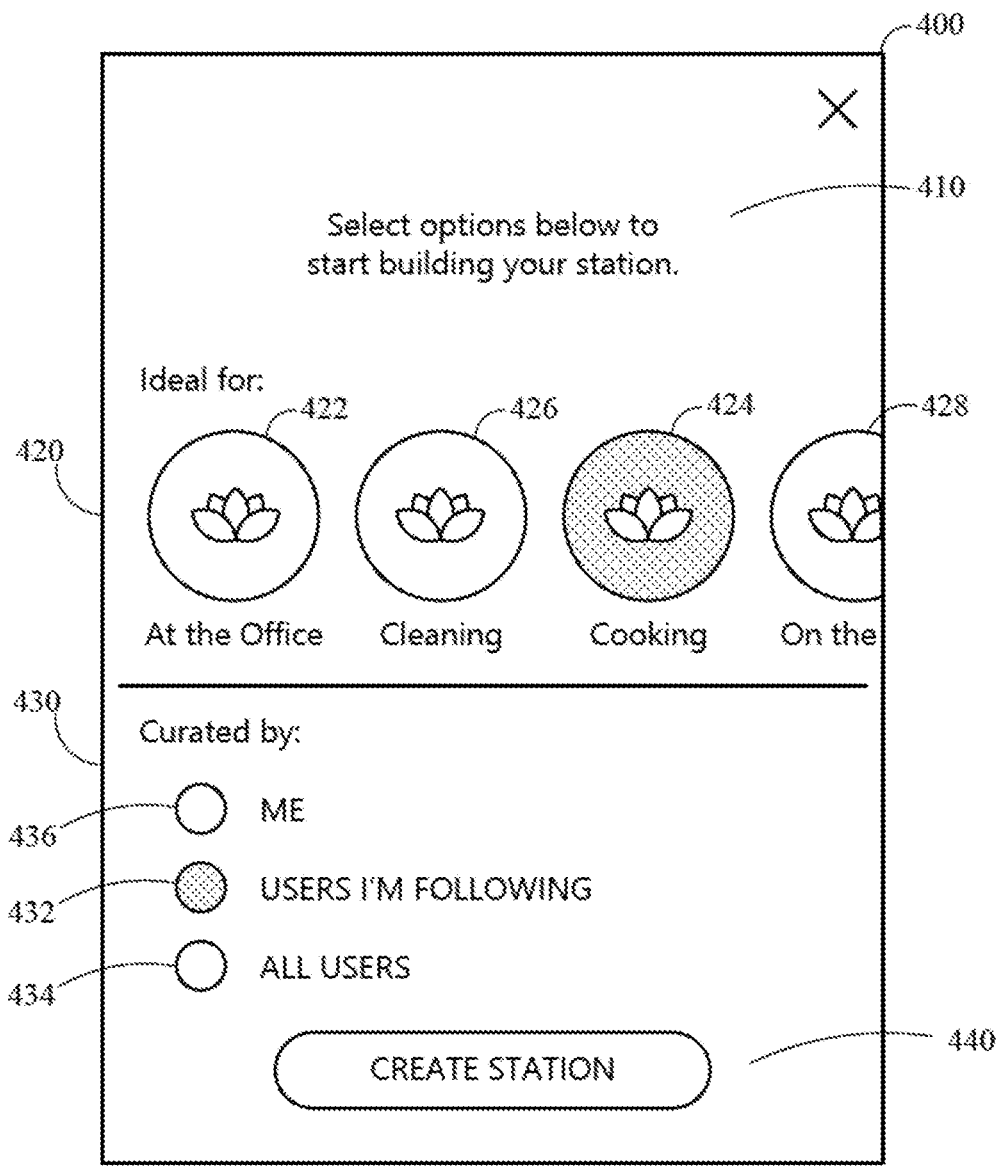
FIG. 4 is a diagram illustrating an example of a portion of a user interface for contextual curated content sequence management in accordance with embodiments of this disclosure.

FIG. 4 shows an example of a user interface 400 for controlling the generation of a content sequence request. As shown, the user interface 400 for controlling the generation of a content sequence request includes a descriptive portion 410, which describes the features and functions of the user interface 400 for controlling the generation of a content sequence request, a context control portion 420, a content curator control portion 430, and a content sequence request generation control 440.

The context control portion 420 includes context indication controls 422, 424, 426, 428. In some embodiments, a context indication control 422, 424, 426, 428 may be identified in response to input, such as user input, selecting the respective context indication control 422, 424, 426, 428. In some embodiments, a selected context indication control may be visually differentiated from unselected context indication controls. For example, the 'Cooking' context indication control 424 is shown with a stippled background to indicated that it is a selected context indication control. Although not expressly shown in FIG. 4, in some embodiments, multiple context indication controls may be identified.

In some embodiments, one or more of the context indication controls 422, 424, 426, 428 currently included in the context control portion 420 may be omitted from the context control portion 420 and one or more additional context indication controls (not shown) may be included in the context control portion 420. For example, the context indication controls included in the context control portion 420 may change in response to input, such as user input, scrolling, swiping, or dragging horizontally across the context control portion 420.

The content curator control portion 430 includes content curator controls 432, 434, 436. In some embodiments, a content curator control 432, 434, 436 may be identified in response to input, such as user input, selecting a content curator control 432, 434, 436. In some embodiments, a selected content curator control may be visually differentiated from unselected content curator controls. For example, the 'Users I'm Following' content curator control 432 is shown with a stippled background to indicate that it is a selected content curator control. Although not expressly shown in FIG. 4, in some embodiments, multiple content curators may be identified.

In some embodiments, the content sequence request generation control 440 may be inactive, such as greyed out, until a context and a curator are selected. In some embodiments, a curated content sequence may be generated as shown in FIG. 2 in response to input, such as user input, selecting the content sequence request generation control 440.

Figure 5:
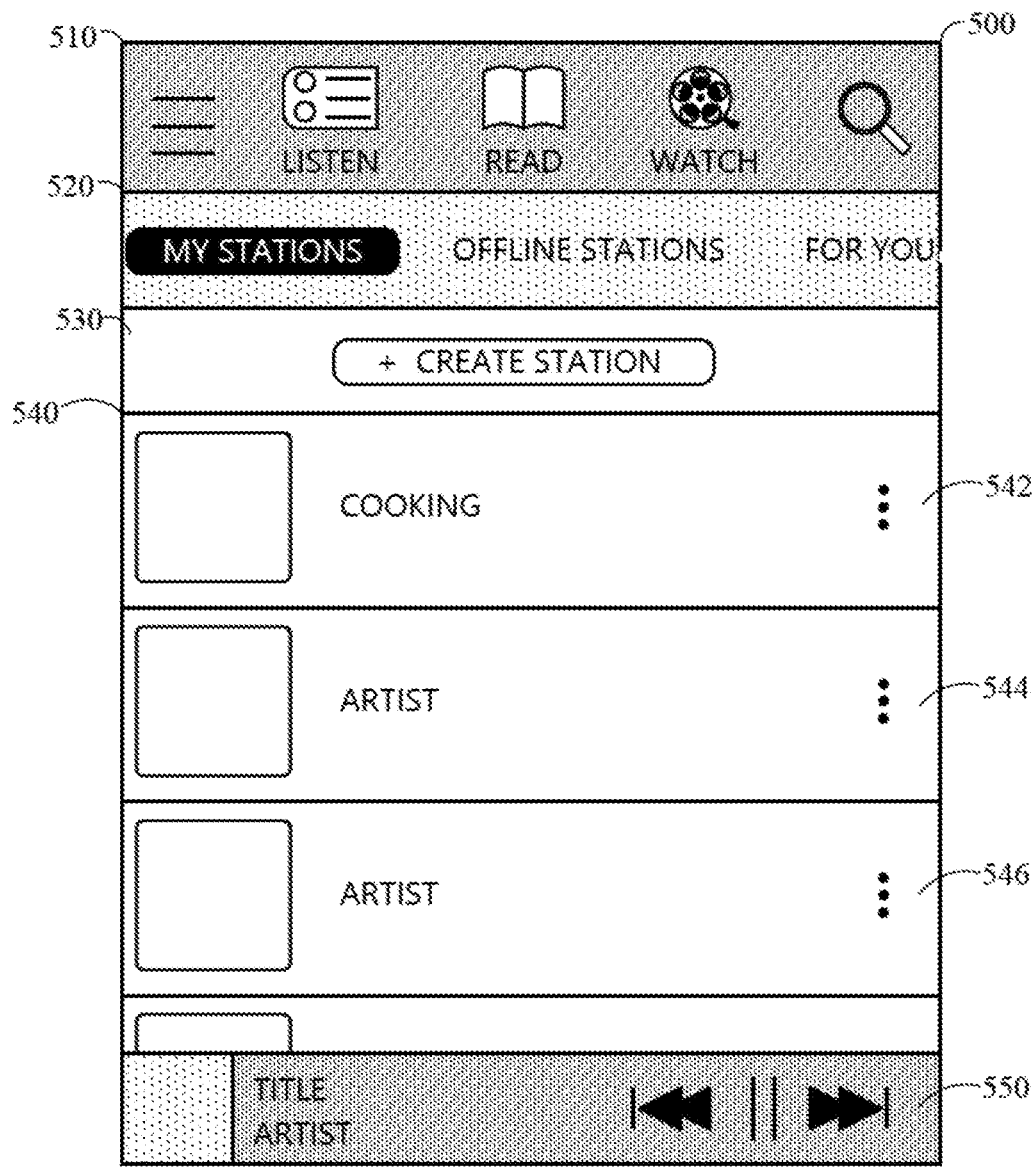
FIG. 5 is a diagram illustrating an example of a portion of a user interface for contextual curated content sequence management in accordance with embodiments of this disclosure.

FIG. 5 shows an example of a user interface 500 for listing content sequences. As shown, the user interface 500 for listing content sequences includes a system control portion 510, which includes system controls, content sequence control portions 520, 530, which includes controls for viewing and managing content sequences, a content sequence list portion 540, which includes content sequence portions 542, 544, 546, and a content control portion 550, which includes controls for controlling active content. The content sequence, or station, requested using the user interface 400 shown in FIG. 4, and generated as shown in FIG. 2, may be represented by the content sequence portion 542 at the top of the content sequence list portion 540. In response to receiving the content sequence sent as shown at 240 in FIG. 2, the first content object in the content sequence may be automatically presented to the user, and the presentation thereof may be controlled by the content control portion 550.

Figure 6:
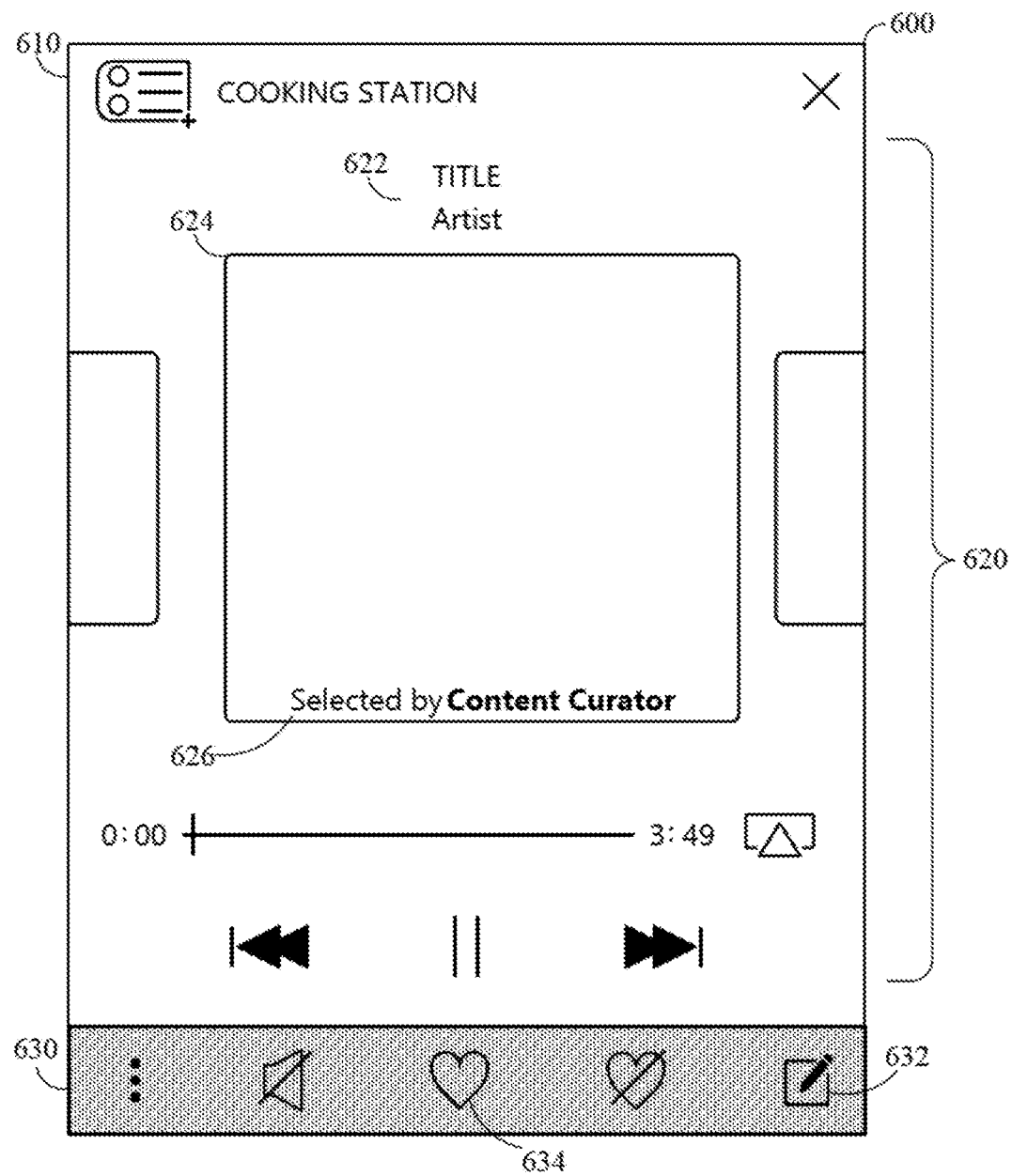
FIG. 6 is a diagram illustrating an example of a portion of a user interface for contextual curated content sequence management in accordance with embodiments of this disclosure.

FIG. 6 shows an example of a user interface 600 for managing a content sequence. As shown, the user interface 600 for managing a content sequence includes a header portion 610, which includes a description of the current content sequence, a content control portion 620, and a content sequence control portion 630. The content control portion 620 includes a description, including a title and artist, or author, for the currently active content object. The content control portion 620 includes a pictographic representation 624 of the current active content object, such as album art.

The content control portion 620 includes a curator portion 626, which indicates the content curator that positively reviewed the currently active content object for the currently active context. The curator portion 626 may include a name of the content curator, as indicated by the bold text 'Content Curator'. In some implementations, the curator portion 626 may be superimposed on the pictographic representation 624 of the current active content object. In some implementations, information regarding the content curator, such as profile information, may be presented in response to input, such as user input, selecting the curator portion 626. In some implementations, the curator portion 626 may be omitted. For example, the currently active content may be curated by the user that requested the content sequence, and the curator portion 626 may be omitted.

The content sequence control portion 630 includes controls, such as the edit content sequence control 632 and the positive content evaluation control 634. In some embodiments, an edit content sequence user interface may be presented in response to input, such as user input, selecting the edit content sequence control 632. The edit content sequence user interface may be similar to the user interface 400 for controlling the generation of a content sequence request shown in FIG. 4, except that context and curator for the current content sequence may be automatically selected. In some embodiments, a content evaluation user interface, such as the content evaluation user interface shown in FIG. 7, may be presented in response to input, such as user input, selecting the positive content evaluation control 634.

Figure 7:
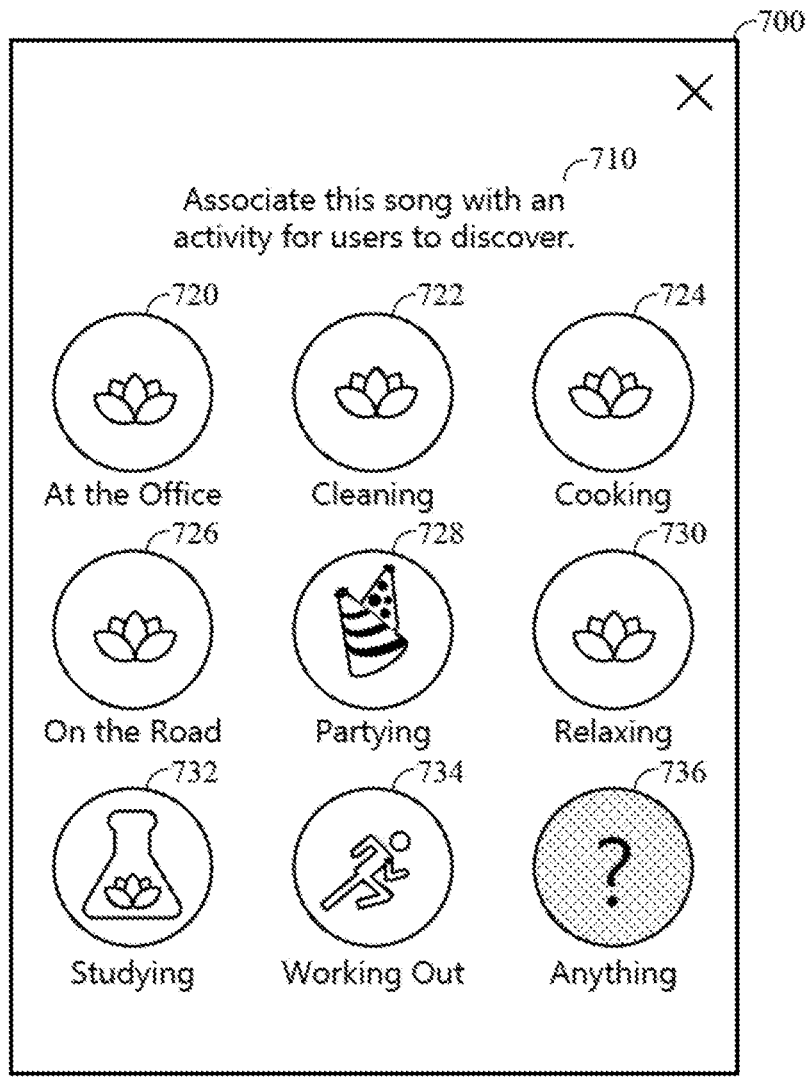
FIG. 7 is a diagram illustrating an example of a portion of a user interface for contextual curated content sequence management in accordance with embodiments of this disclosure.

FIG. 7 shows an example of a user interface 700 for reviewing content. As shown, the user interface 700 for reviewing content includes a descriptive portion 710, which describes the features and functions of the user interface 700, and context indication controls 720-736. As shown, the context indication controls 720-736 include a working context indication control 720 representing an activity related to working and labeled 'At the Office', a cleaning context indication control 722 representing an activity related to cleaning, a cooking context indication control 724 representing an activity related to cooking, a driving context indication control 726 representing an activity related to traveling and labeled 'On the Road', a partying context indication control 728 representing an activity related to partying, a relaxing context indication control 730 representing an activity related to relaxing, a studying context indication control 732 representing an activity related to studying, an exercising context indication control 734 representing an activity related to exercising and labeled 'Working Out', and an anything control 736 representing activities other than the activities represented by the other context controls 720-734.

In some embodiments, a context indication control 720-736 may be selected. For example, the anything control 736 may be automatically selected. In another example, a context indication control 720-736 may be selected in response to input, such as user input, selecting the context indication control 720-736.

In some embodiments, a message or signal indicating an evaluation and a selected context for the current content object may be generated and sent, and may be received as shown at 200 in FIG. 2. For example, the content evaluation information may be sent in response to input, such as user input, selecting the context indication control 720-736. In some embodiments, the content evaluation information may be sent in response to the expiration of a timer. For example, a timer may be initiated in response to presenting the user interface 700 for reviewing content, the expiration of the timer may be identified after a defined time period, such as two or three seconds, and the content evaluation information may be sent in response to the expiration of the timer. In some embodiments, presentation of the user interface 700 for reviewing content may be omitted or terminated in response to input, such as user input, selecting the context indication control 720-736, or in response to expiration of the timer. In some implementations, the user interface 700 for reviewing content may be presented superimposed over another user interface, such as the user interface 600 shown in FIG. 6.

Although FIG. 7 shows nine activities, or contexts, 720-736, any number of contexts may be used. In some embodiments, a context may be a system defined context. In some embodiments, a context may be a user defined context. For example, a context may be identified in response to input, such as user input, indicating a name, a description, or any other defining information for the context.

Although not shown in FIG. 7, in some embodiments, the user interface 700 for reviewing content may include a suppression control and presentation of the user interface 700 for reviewing content may be omitted in response to previously recorded input, such as user input, selecting the suppression control for the user interface 700 for reviewing content, and the anything context may be automatically selected.

Figure 8:
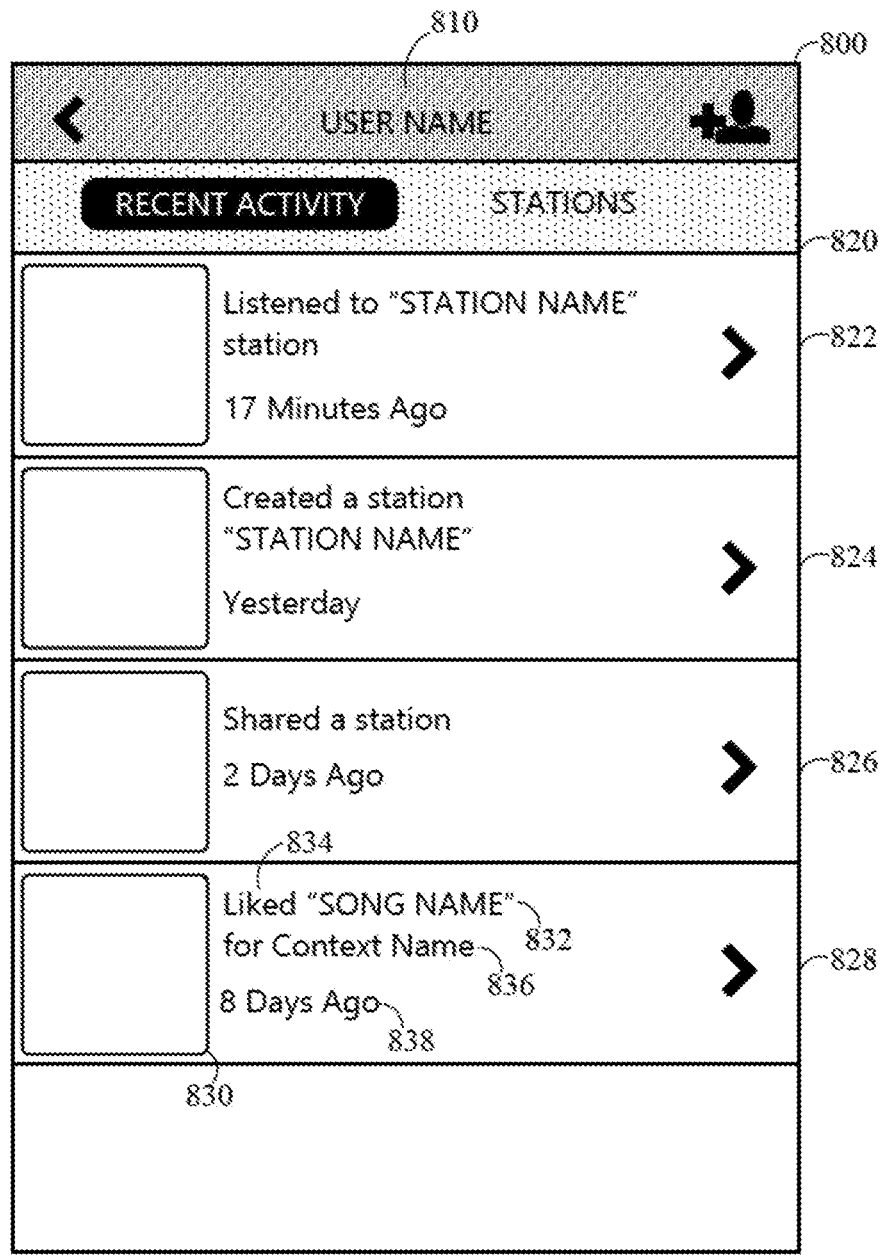
FIG. 8 is a diagram illustrating an example of a portion of a user interface for contextual curated content sequence management in accordance with embodiments of this disclosure.

FIG. 8 shows an example of a user interface 800 for viewing recent actions of a user, such as the recent actions of a user, or content curator, other than the current user. As shown, the user interface 800 for viewing recent actions includes header portion including a name of the user, or content curator, associated with the recent actions, and a recent actions list portion 820. The recent actions list portion 820 includes a list of recent action portions 822, 824, 826, 828. Each recent action portion 822, 824, 826, 828 represents a recent action performed by the user, or content curator, for a content object, and includes information representing the recent action. For example, the recent action portion 828 shown at the bottom represents the generation of content evaluation information for a content object by the user, or content curator, and includes album art 830 for the content object, a title 832 for the content object, a description 834 of the action, a name of the context 836 of the action, and a temporal indicator 838, which may include a time, a date, or both, for the action. In some embodiments, a user interface for managing a content sequence, such as the user interface 600 for managing a content sequence shown in FIG. 6, may be presented in response to input, such as user input, selecting a recent action portion associated with a context, such as the recent action portion 828.

Figure 9:
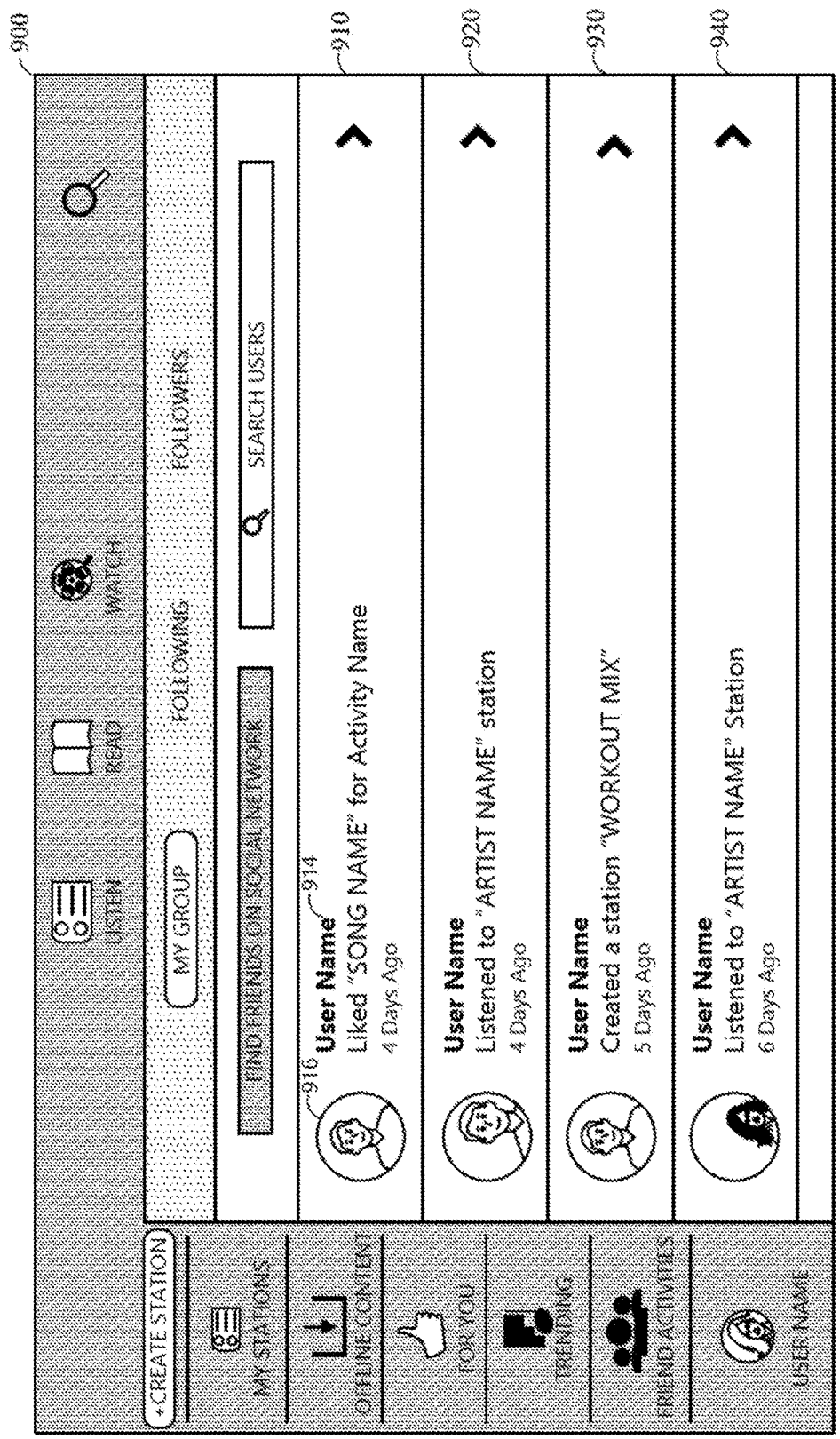
FIG. 9 is a diagram illustrating an example of a portion of a user interface for contextual curated content sequence management in accordance with embodiments of this disclosure.

FIG. 9 shows an example of a user interface 900 for viewing recent actions of users or content creators. The user interface 900 for viewing recent actions of users or content creators may be similar to the user interface 800 for viewing recent actions of a user or content creator shown in FIG. 8 except as shown and described. As shown in FIG. 9, each recent action portion 910, 920, 930, 940 may be associated with a respective user, or content curator, and a respective action, and may include a pictographic representation 912 of the corresponding user, or content creator, such as an avatar or an icon, and a name 914 of the corresponding user, or content creator.

FIGS. 10-24 are diagrams of examples of portions of a user interface for hashtag-playlist access and management in accordance with implementations of this disclosure. A hashtag-playlist may be a content sequence and may include an ordered or unordered sequence of content, or references to corresponding content, associated with a defined hashtag. A hashtag may include a value, such as at text string value, that may be associated with content such that the content may be identified based on the hashtag, such as by searching. A hashtag may be delimited using a reserved or special character or symbol such as the number sign or pound sign (#). In some implementations, a hashtag-playlist may include content other than content associated with the corresponding hashtag. For example, a hashtag-playlist may include automatically identified content that is unassociated with the respective hashtag, such as content identified based on a similarity between the unassociated content and content associated with the hashtag or based on a similarity between the hashtag and a different hashtag, wherein the other content is associated with the different hashtag.

Figure 10:
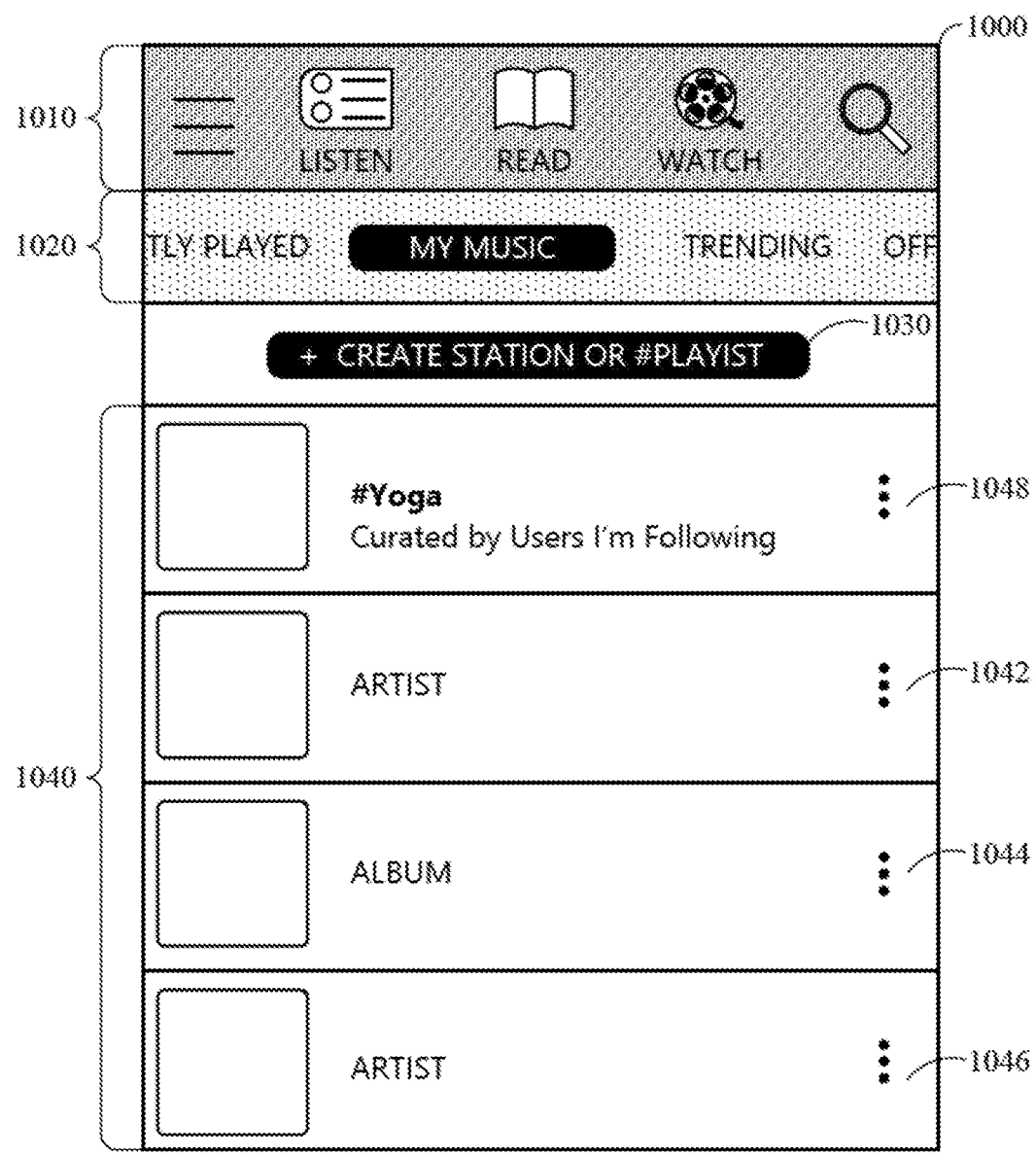
FIG. 10 shows an example of a user interface for listing content sequences including hashtag-playlists 1000 in accordance with implementations of this disclosure.

FIG. 10 shows an example of a user interface for listing content sequences including hashtag-playlists 1000 in accordance with implementations of this disclosure. The user interface for listing content sequences including hashtag-playlists 1000 may be presented in response to receiving information indicating a selection of, or a request for, the user interface for listing content sequences including hashtag-playlists 1000, such as in response to receiving information indicating input, such as user input, selecting the user interface for listing content sequences including hashtag-playlists 1000.

As shown, the user interface for listing content sequences including hashtag-playlists 1000 includes an activity control portion 1010, a content-space portion 1020, a create sequence control 1030, and a content sequences list portion 1040.

The activity control portion 1010 includes system controls. The content-space portion 1020 includes controls for viewing and accessing content sequences including hashtag-playlists. The content sequences list portion 1040 includes content sequence portions 1042, 1044, 1046, and a hashtag-playlist portion 1048.

In response to receiving information indicating a selection of the create sequence control 1030, such as in response to receiving information indicating input, such as user input, selecting the create sequence control 1030, a user interface for accessing hashtag-playlist generation may be presented. An example of a user interface for accessing hashtag-playlist generation is shown in FIG. 11.

Figure 11:
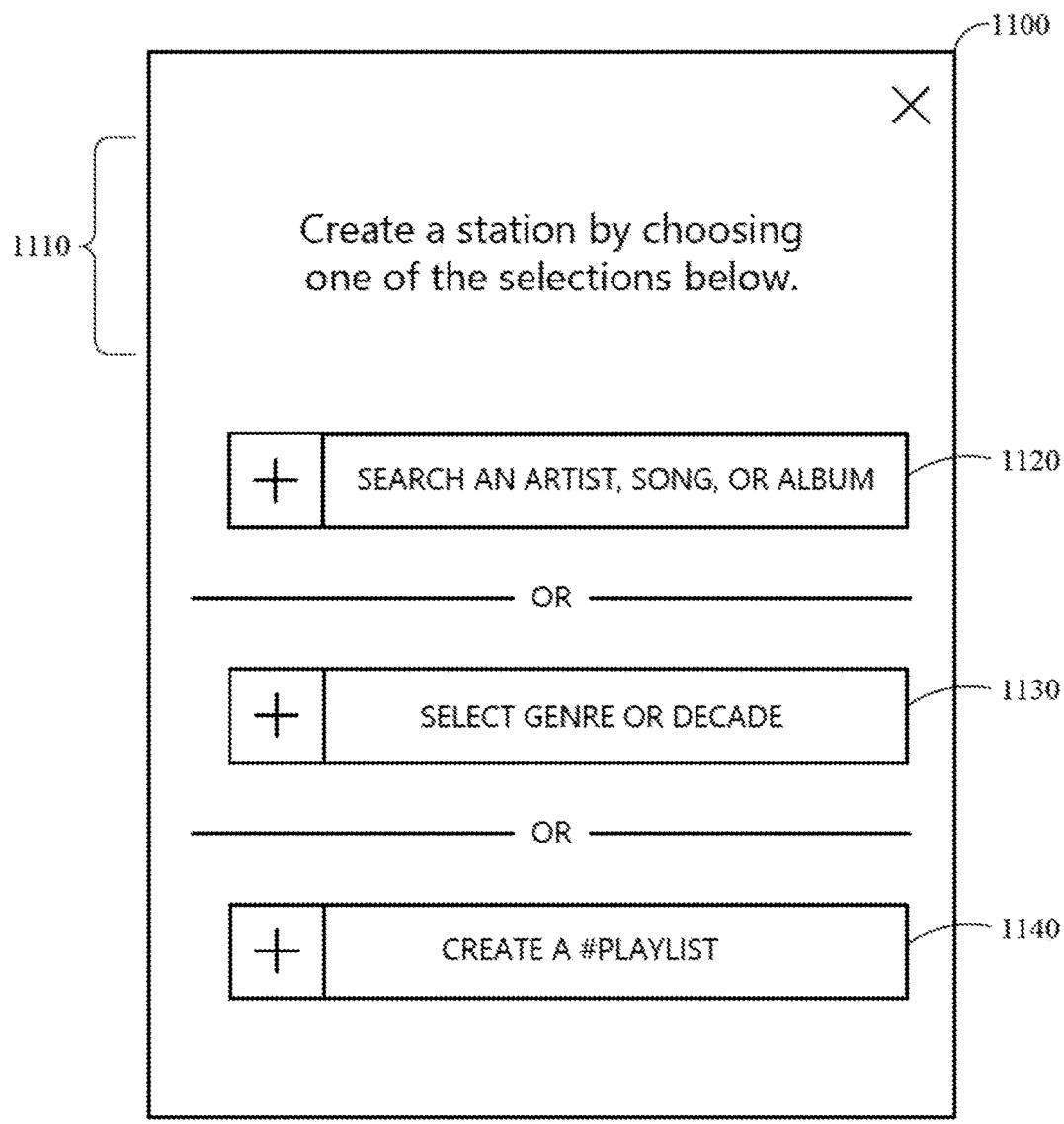
FIG. 11 shows an example of a user interface for accessing hashtag-playlist generation 1100 in accordance with implementations of this disclosure.

FIG. 11 shows an example of a user interface for accessing hashtag-playlist generation 1100 in accordance with implementations of this disclosure. The a user interface for accessing hashtag-playlist generation 1100 may be presented in response to receiving information indicating a selection of, or a request for, the a user interface for accessing hashtag-playlist generation 1100, such as in response to receiving information indicating input, such as user input, selecting the a user interface for accessing hashtag-playlist generation 1100 via another user interface, such as user interface for listing content sequences including hashtag-playlists 1000 shown in FIG. 10.

As shown in FIG. 11, the user interface for accessing hashtag-playlist generation 1100 includes a descriptive portion 1110, a create-by-search control 1120, a create-by-category control 1130, and a create-hashtag-playlist control 1140.

The descriptive portion 1110 includes a description of the features and functions of the user interface for accessing hashtag-playlist generation 1100.

In response to receiving information indicating a selection of the create-hashtag-playlist control 1140, such as in response to receiving information indicating input, such as user input, selecting the create-hashtag-playlist control 1140, a user interface for hashtag-playlist generation may be presented. An example of a user interface for hashtag-playlist generation is shown in FIG. 12.

Figure 12:
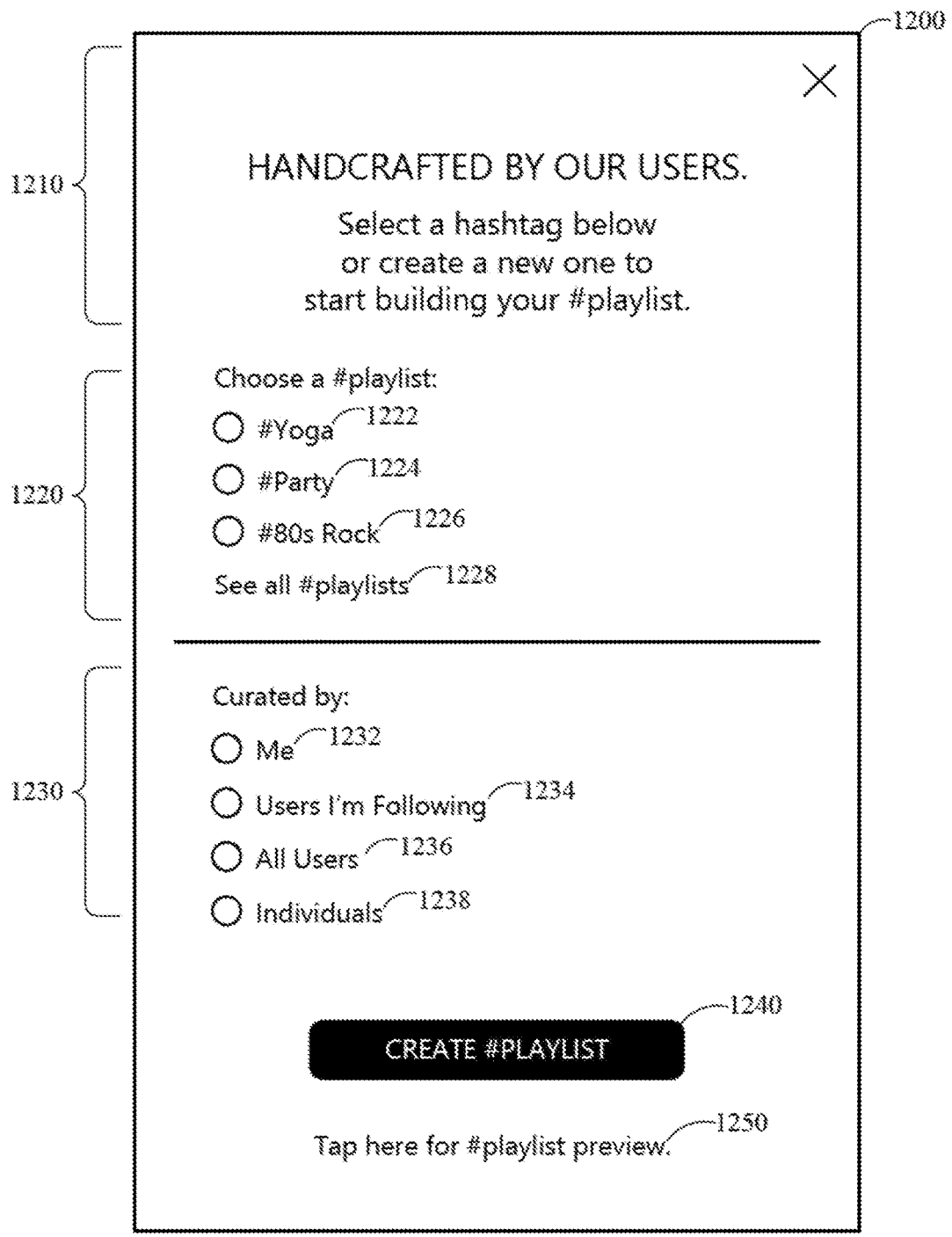
FIG. 12 shows an example of a user interface for selecting a hashtag-playlist 1200 in accordance with implementations of this disclosure.

FIG. 12 shows an example of a user interface for selecting a hashtag-playlist 1200 in accordance with implementations of this disclosure. The user interface for selecting a hashtag-playlist 1200 may be presented in response to receiving information indicating a selection of, or a request for, the user interface for selecting a hashtag-playlist 1200, such as in response to receiving information indicating input, such as user input, selecting the user interface for selecting a hashtag-playlist 1200 via another user interface, such as user interface for accessing hashtag-playlist generation 1100 shown in FIG. 11.

As shown in FIG. 12, the user interface for selecting a hashtag-playlist 1200 includes a descriptive portion 1210, a hashtag-playlists control portion 1220, a content curator control portion 1230, a hashtag-playlist generation control 1240, and a hashtag-playlist preview control 1250.

The descriptive portion 1210 includes a description of the features and functions of the user interface for selecting a hashtag-playlist 1200. The descriptive portion 1210 may include one or more controls for controlling the user interface for selecting a hashtag-playlist 1200.

The hashtag-playlists control portion 1220 includes hashtag-playlist indication controls 1222, 1224, 1226, and an access hashtag-playlists control 1228.

In response to receiving information indicating a selection of a hashtag-playlist indication control 1222, 1224, 1226, such as in response to receiving information indicating input, such as user input, selecting the hashtag-playlist indication control 1222, 1224, 1226, the respective hashtag-playlist indication control 1222, 1224, 1226 may be identified as a selected hashtag-playlist indication control. Although not shown in FIG. 13, a selected hashtag-playlist indication control may be visually differentiated from other, unselected, hashtag-playlist indication controls.

Figure 13:
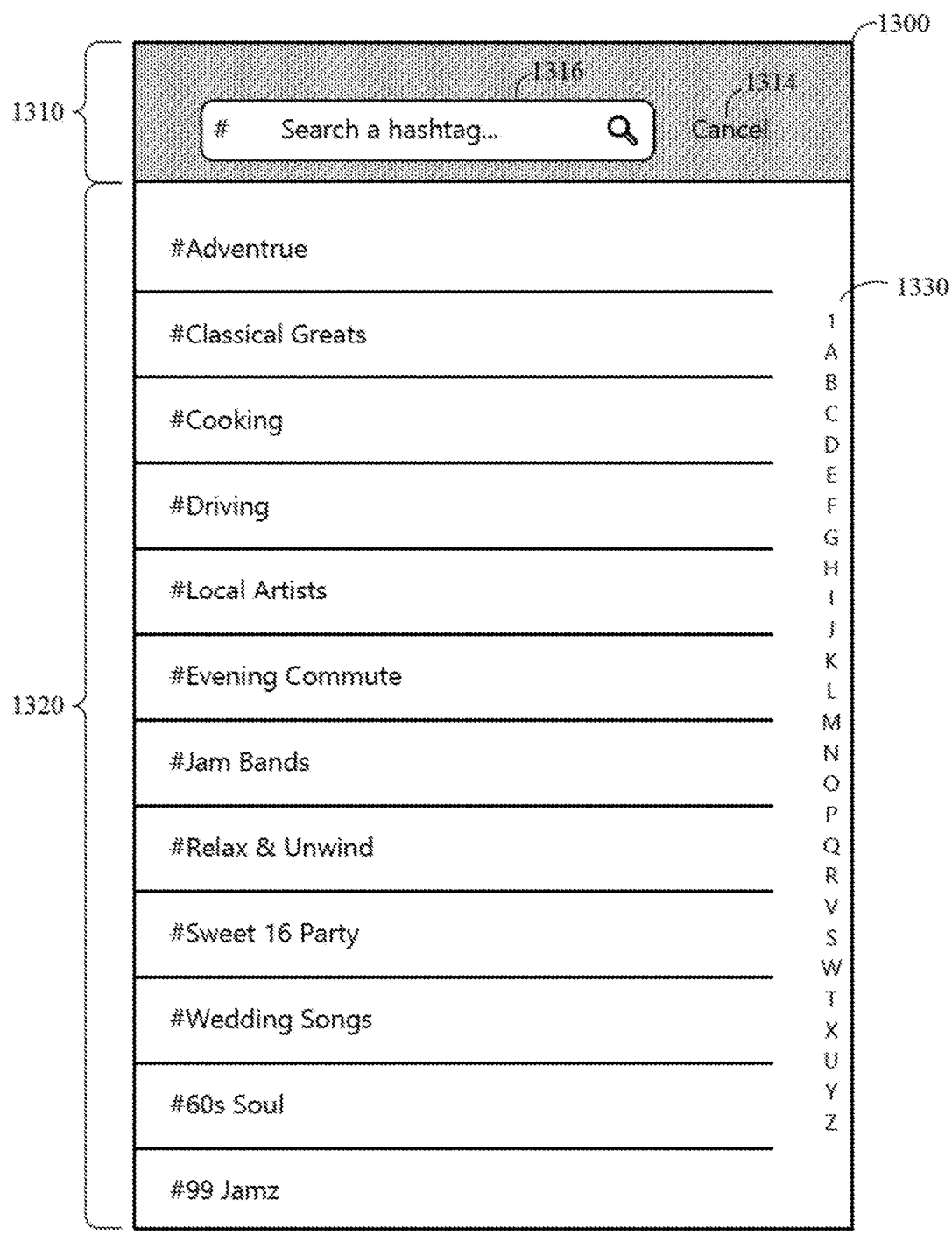
FIG. 13 shows an example of a user interface for listing hashtag-playlists 1300 in accordance with implementations of this disclosure.

In response to receiving information indicating a selection of the access hashtag-playlists control 1228, such as in response to receiving information indicating input, such as user input, selecting the access hashtag-playlists control 1228, a user interface for listing hashtag-playlists may be presented. An example of a user interface for listing hashtag-playlists is shown in FIG. 13.

In some embodiments, one or more of the hashtag-playlist indication controls 1222, 1224, 1226 shown in the hashtag-playlists control portion 1220 may be omitted from the hashtag-playlists control portion 1220 and one or more other hashtag-playlist indication controls (not shown) may be included in the hashtag-playlists control portion 1220. For example, the hashtag-playlist indication controls included in the hashtag-playlists control portion 1220 may include a defined cardinality, such as three, hashtag-playlist indication controls. The hashtag-playlist indication controls included in the hashtag-playlists control portion 1220 may correspond with hashtag-playlists associated with a user of the user interface for selecting a hashtag-playlist 1200. The hashtag-playlist indication controls included in the hashtag-playlists control portion 1220 may include hashtag-playlists identified based on a metric, such as a popularity metric or a trending metric, which may be unassociated with the user of the user interface for selecting a hashtag-playlist 1200. Although not expressly shown in FIG. 12, one or more of the hashtag-playlist indication controls 1222, 1224, 1226 may correspond to a hashtag-playlist identified using a user interface for listing hashtag-playlists, such as the user interface for listing hashtag-playlists is shown in FIG. 13.

The content curator control portion 1230 includes content curator controls 1232, 1234, 1236, 1238. A content curator control 1232, 1234, 1236, 1238 may be identified in response to input, such as user input, selecting a content curator control 1232, 1234, 1236, 1238.

In response to receiving information indicating a selection of a content curator control 1232, 1234, 1236, 1238, such as in response to receiving information indicating input, such as user input, selecting the content curator control 1232, 1234, 1236, 1238, the respective content curator control 1232, 1234, 1236, 1238 may be identified as a selected content curator control. Although not shown in FIG. 13, a selected content curator control may be visually differentiated from other, unselected, content curator controls. Although not expressly shown in FIG. 12, in some embodiments, multiple content curators may be identified.

In response to receiving information indicating a selection of the individuals content curator control 1238, such as in response to receiving information indicating input, such as user input, selecting the individuals content curator control 1238, a user interface for listing content curators may be presented (not shown). Although not expressly shown in FIG. 12, one or more of the content curator controls 1232, 1234, 1236, 1238 may correspond to a content curator identified using the user interface for listing content curators.

A selected hashtag-playlist, a selected content curator, or both, may be unavailable, such as unidentified, and the hashtag-playlist generation control 1240 may be inactive or inaccessible, which may include visually differentiating the hashtag-playlist generation control 1240, such as by greying out the hashtag-playlist generation control 1240. In response receiving information indicating a selected hashtag-playlist and a selected content curator, the hashtag-playlist generation control 1240 may be activated.

In some embodiments, one or more of the content curator controls 1234, 1236, 1238, other than the "Me" content curator control 1232, may correspond with an unavailable content curator. An unavailable content curator may be a content curator for which information associating content with the hashtag-playlist selected at 1220 is unavailable. For example, the #Yoga hashtag-playlist control 1222 may be selected, the user, or the corresponding user account, using the user interface for selecting a hashtag-playlist 1200 may be following a defined set of other users, information indicating content for the #Yoga hashtag-playlist curated by users from the defined set of other users may be unavailable, which may indicate that the other users may have omitted hashtagging content for the #Yoga hashtag, and the "Users I'm Following" content curator control 1234 may correspond with unavailable content curators. In some embodiments, one or more of the content curator controls 1234, 1236, 1238 associated with unavailable content curators may be omitted from or disabled in the user interface for selecting a hashtag-playlist 1200.

A hashtag-playlist may be generated in response to input, such as user input, selecting the hashtag-playlist generation control 1240. In some embodiments, the selected content curator control selected at 1230 may be associated with unavailable content curators, generating the hashtag-playlist may be omitted and information indicating that content for the combination of #playlist and content curator identified is unavailable may be presented.

FIG. 13 shows an example of a user interface for listing hashtag-playlists 1300 in accordance with implementations of this disclosure. The user interface for listing hashtag-playlists 1300 may be presented in response to receiving information indicating a selection of, or a request for, the user interface for listing hashtag-playlists 1300, such as in response to receiving information indicating input, such as user input, selecting the user interface for listing hashtag-playlists 1300 via another user interface, such as the user interface for selecting a hashtag-playlist 1200 shown in FIG. 12 or the user interface for accessing a content group 2200 shown in FIG. 22.

As shown in FIG. 13, the user interface for listing hashtag-playlists 1300 includes a search control portion 1310, a hashtag-playlists list portion 1320, and an alpha index control 1330.

The search control portion 1310 includes a search term input control 1312 and a search cancel control 1314. In response to receiving information indicating a selection of the search cancel control 1314, a recent or previous user interface, such as the user interface for selecting a hashtag-playlist 1200 shown in FIG. 12 or the user interface for accessing a content group 2200 shown in FIG. 22, may be presented, which may omit outputting information indicating a selected hashtag-playlist or may include outputting information indicating that information indicating a selected hashtag-playlist is unavailable.

The hashtag-playlists list portion 1320 may include a list of previously generated hashtag-playlists, or a portion thereof, which may be ordered alpha-numerically, and which may be scrollable, such as in response to receiving input indicating user input, such as user input scrolling, swiping, or dragging vertically along the hashtag-playlists list portion 1320, or indicating a selection of a portion of the alpha index control 1330.

Figure 14:
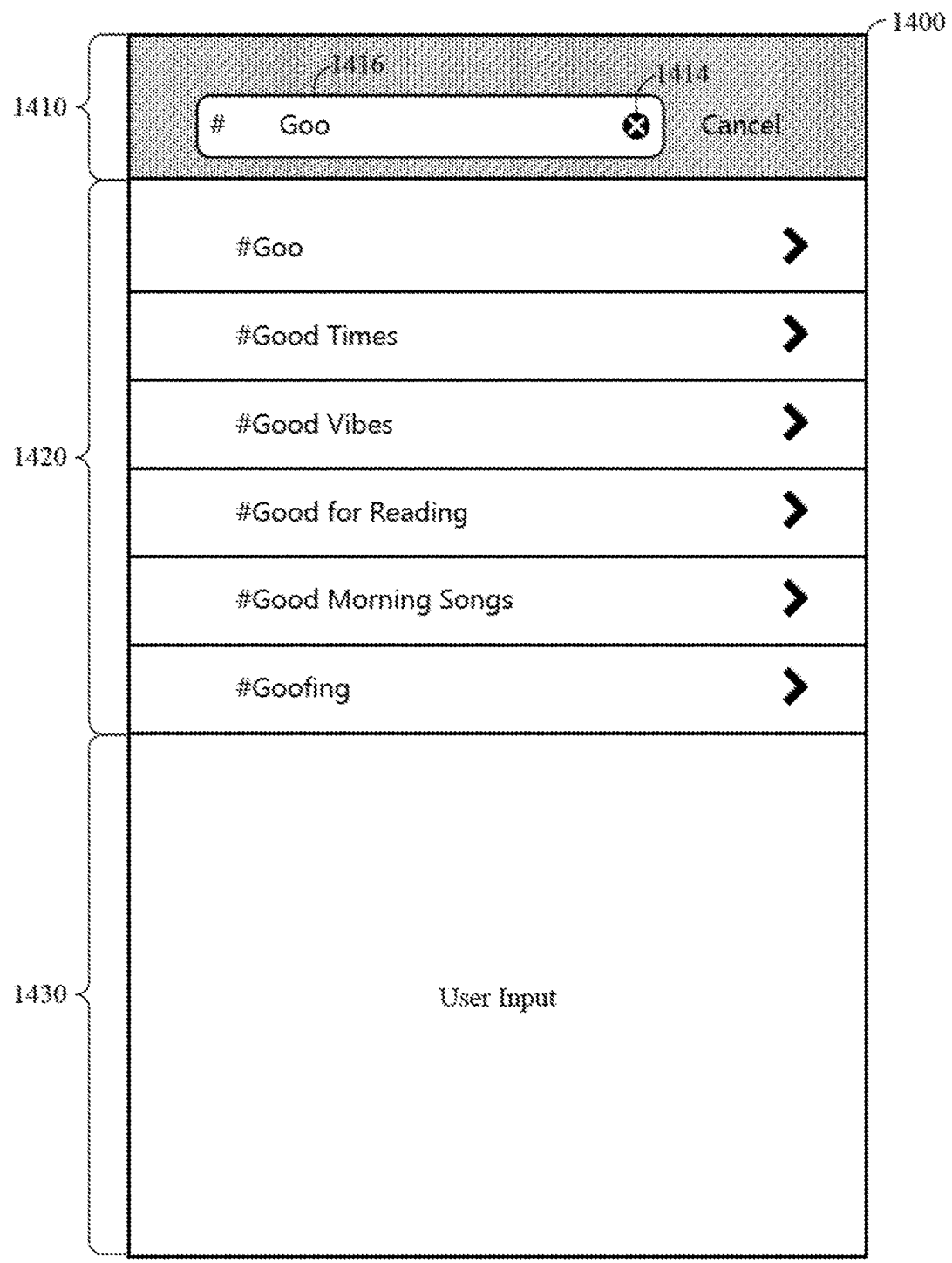
FIG. 14 shows an example of a user interface for listing hashtag-playlists with a search term 1400 in accordance with implementations of this disclosure.

In response to receiving information indicating a search term, such as information received in response to user input, such as text input, corresponding to the search term input control 1312, the hashtag-playlists list portion 1320 may be updated, or scrolled, such that a previously generated hashtag-playlist alpha-numerically corresponding to, such as most closely matching, the search term is scrolled, or otherwise presented, at the top of the list of previously generated hashtag-playlists shown in the hashtag-playlists list portion 1320. An example of a user interface for listing previously generated hashtag-playlists with a search term is shown in FIG. 14.

Figure 15:
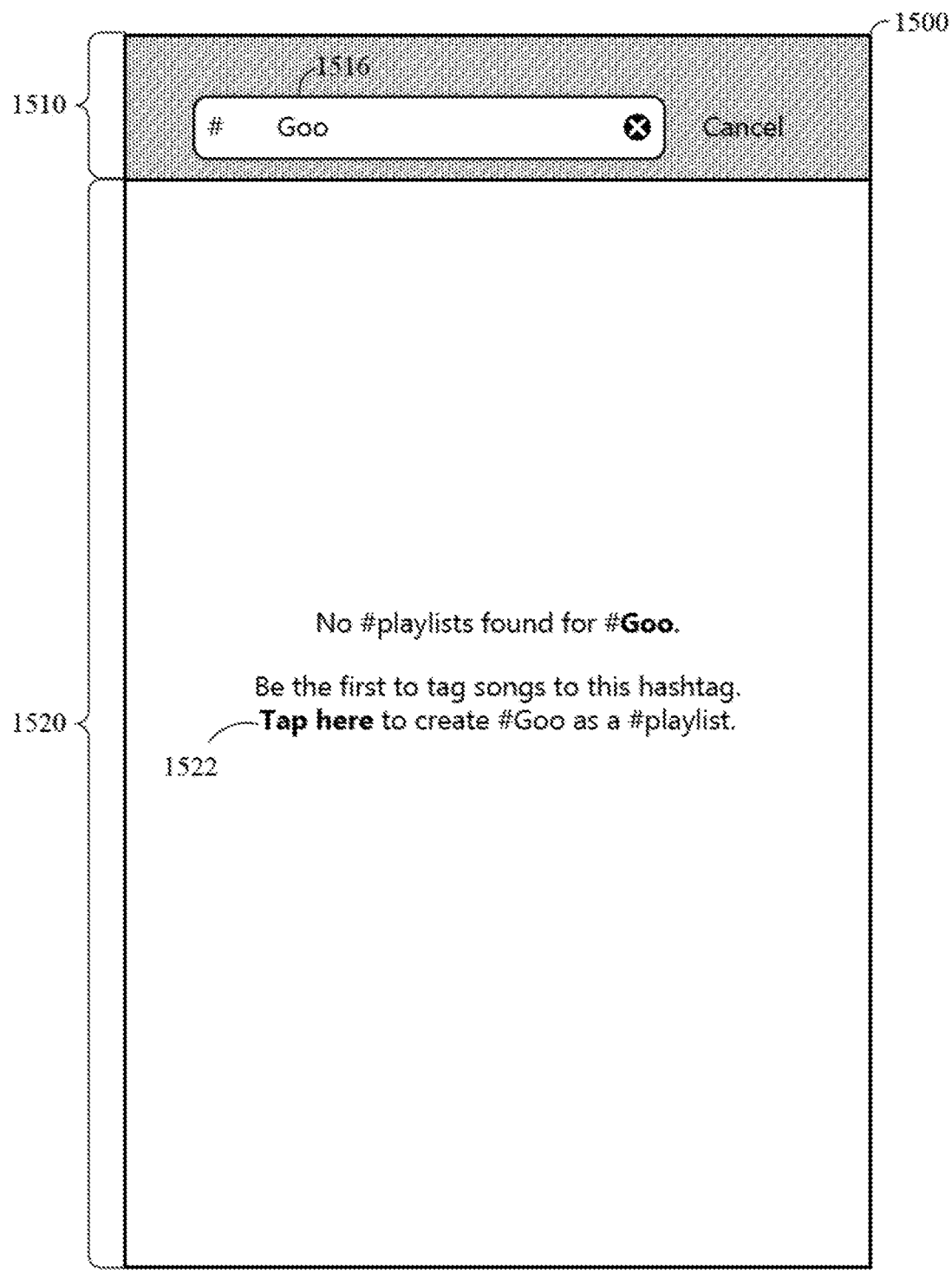
FIG. 15 shows an example of a novel hashtag-playlist search user interface 1500 in accordance with implementations of this disclosure.

In some embodiments, a previously generated hashtag-playlist alpha-numerically corresponding to the search term may be unavailable, and a novel hashtag-playlist search user interface may be presented. An example of a novel hashtag-playlist search user interface is shown in FIG. 15.

A selected hashtag-playlist may be identified in response to input, such as user input, selecting the hashtag-playlist from the hashtag-playlists list portion 1320.

Figure 22:
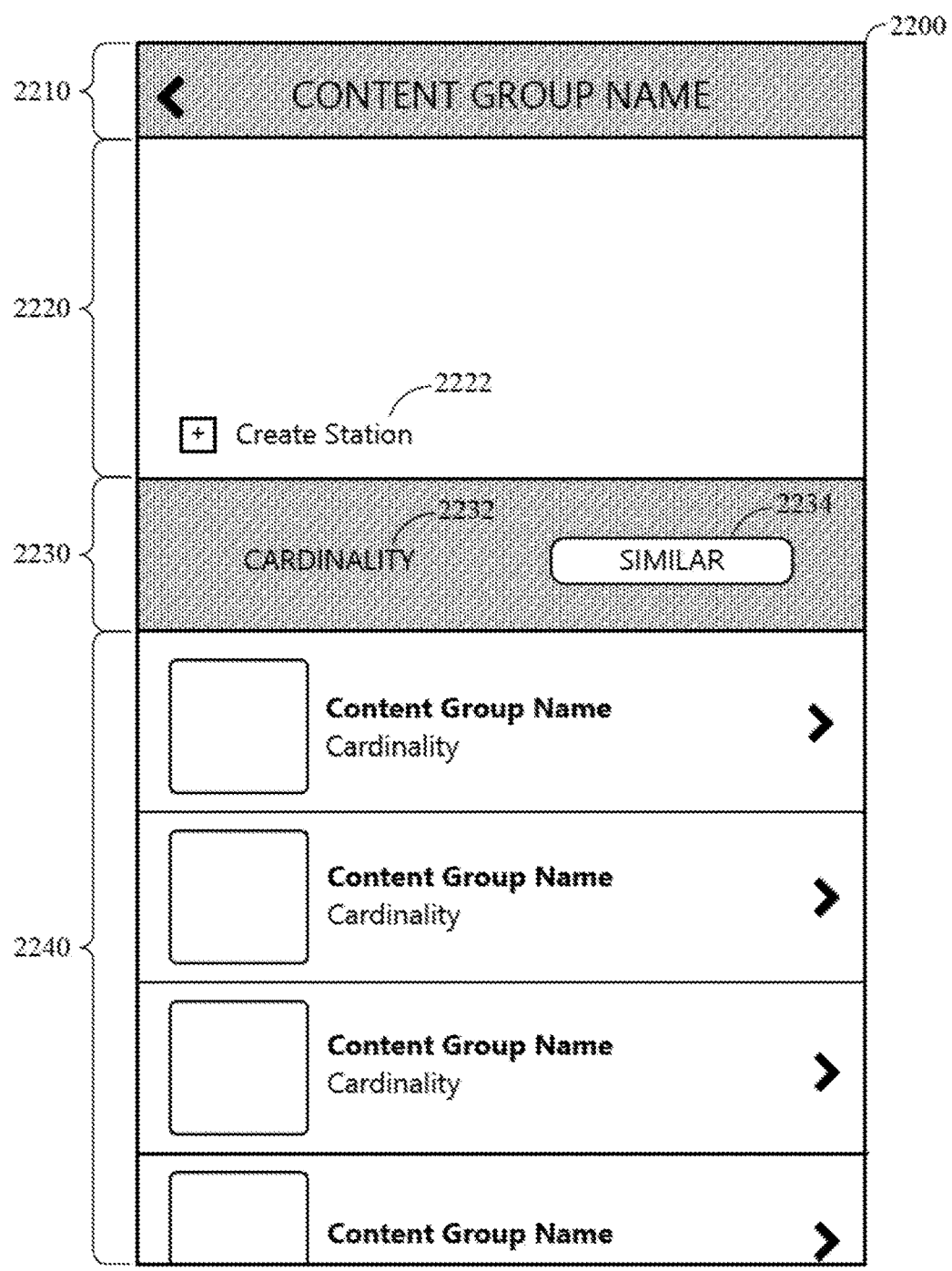
FIG. 22 shows an example of a user interface for accessing a content group 2200 in accordance with implementations of this disclosure.

In response to receiving information indicating a selection of a hashtag-playlist, such as in response to receiving information indicating input, such as user input, selecting the hashtag-playlist from the hashtag-playlists list portion 1320, information indicating the selected hashtag-playlist may be output, or otherwise made available, to a recent or previous user interface, such as the user interface for selecting a hashtag-playlist 1200 shown in FIG. 12 or the user interface for accessing a content group 2200 shown in FIG. 22, presentation of the user interface for listing hashtag-playlists 1300 may cease, and the recent or previous user interface, such as the user interface for selecting a hashtag-playlist 1200 shown in FIG. 12 or the user interface for accessing a content group 2200 shown in FIG. 22, may be presented.

FIG. 14 shows an example of a user interface for listing hashtag-playlists with a search term 1400 in accordance with implementations of this disclosure. The user interface for listing hashtag-playlists with a search term 1400 may be similar to the user interface for listing hashtag-playlists 1300 shown in FIG. 13, except as described herein. The user interface for listing hashtag-playlists with a search term 1400 may be presented in response to receiving information indicating a selection of, or a request for, a hashtag-playlist search term, such as in response to receiving information indicating input, such as user input, indicating the hashtag-playlist search term via another user interface, such as user interface for listing hashtag-playlists 1300 shown in FIG. 13.

As shown in FIG. 14, the user interface for listing hashtag-playlists with a search term 1400 includes a search control portion 1410, a hashtag-playlist list portion 1420, and a user input control portion 1430. The user input control portion 1430 may, for example, include a virtual keyboard.

The search control portion 1410 includes a search term input control 1412, which includes the search term 'Goo', and a search clear control 1414. The hashtag-playlist list portion 1420 may include a list of previously generated hashtag-playlists. A previously generated hashtag-playlist alpha-numerically corresponding to, such as most closely matching, the search term 'Goo' shown in the search control portion 1410 is scrolled, or otherwise presented, at the top of the list of previously generated hashtag-playlists shown in the hashtag-playlist list portion 1420.

For example, information indicating input including the letter 'G', may be received, such as in response to user input, and previously generated hashtag-playlists alpha-numerically corresponding to the search term 'G' may be presented in alpha-numeric order in the hashtag-playlist list portion 1420 (not shown).

Subsequently, information indicating subsequent input including the letter 'o', may be received, such as in response to user input, and previously generated hashtag-playlists alpha-numerically corresponding to the search term 'Go' may be presented in alpha-numeric order in the hashtag-playlist list portion 1420 (not shown).

Subsequently, information indicating subsequent input including the letter 'o', may be received, such as in response to user input, and previously generated hashtag-playlists alpha-numerically corresponding to the search term 'Goo' may be presented in alpha-numeric order in the hashtag-playlist list portion 1420 as shown.

In response to receiving information indicating a selection of the search clear control 1414, such as in response to receiving information indicating input, such as user input, selecting the search clear control 1414, the search term may be cleared from the search term input control 1412 and previously generated hashtag-playlists may be presented in alpha-numeric order in the hashtag-playlist list portion 1420, which may be similar to the hashtag-playlists list portion 1320 shown in FIG. 13.

In some embodiments, a previously generated hashtag-playlists alpha-numerically corresponding to the search term may be unavailable, and a novel hashtag-playlist search user interface may be presented. An example of a novel hashtag-playlist search user interface is shown in FIG. 15.

FIG. 15 shows an example of a novel hashtag-playlist search user interface 1500 in accordance with implementations of this disclosure. The novel hashtag-playlist search user interface 1500 may be similar to the user interface for listing hashtag-playlists 1300 shown in FIG. 13 or the user interface for listing hashtag-playlists with a search term 1400 shown in FIG. 14, except as described herein. The novel hashtag-playlist search user interface 1500 may be presented in response to receiving information indicating a novel search term, such as in response to receiving information indicating input, such as user input, indicating the novel search term via another user interface, such as the user interface for listing hashtag-playlists 1300 shown in FIG. 13 or the user interface for listing hashtag-playlists with a search term 1400 shown in FIG. 14.

As shown in FIG. 15, the novel hashtag-playlist search user interface 1500 includes a search control portion 1510, and a novel hashtag-playlist control portion 1520.

The search control portion 1510 includes a search term input control 1512, which includes a search term, such as the search term 'Goo'.

A previously generated hashtag-playlist alpha-numerically corresponding to the search term 'Goo' shown in the search control portion 1510 may be unavailable. The novel hashtag-playlist control portion 1520 may include a description of the features and functions of the novel hashtag-playlist search user interface 1500 and may include a select novel hashtag-playlist control 1522.

In response to receiving information indicating a selection of the select novel hashtag-playlist control 1522, such as in response to receiving information indicating input, such as user input, selecting the select novel hashtag-playlist control 1522, information indicating a selected hashtag-playlist, such as '#Goo', corresponding to the search term, such as 'Goo', shown in the search control portion 1510 may be output, or otherwise made available, to a user interface for hashtag-playlist generation with a novel hashtag-playlist may be presented. An example, of a user interface for hashtag-playlist generation with a novel hashtag-playlist is shown in FIG. 16.

Figure 16:
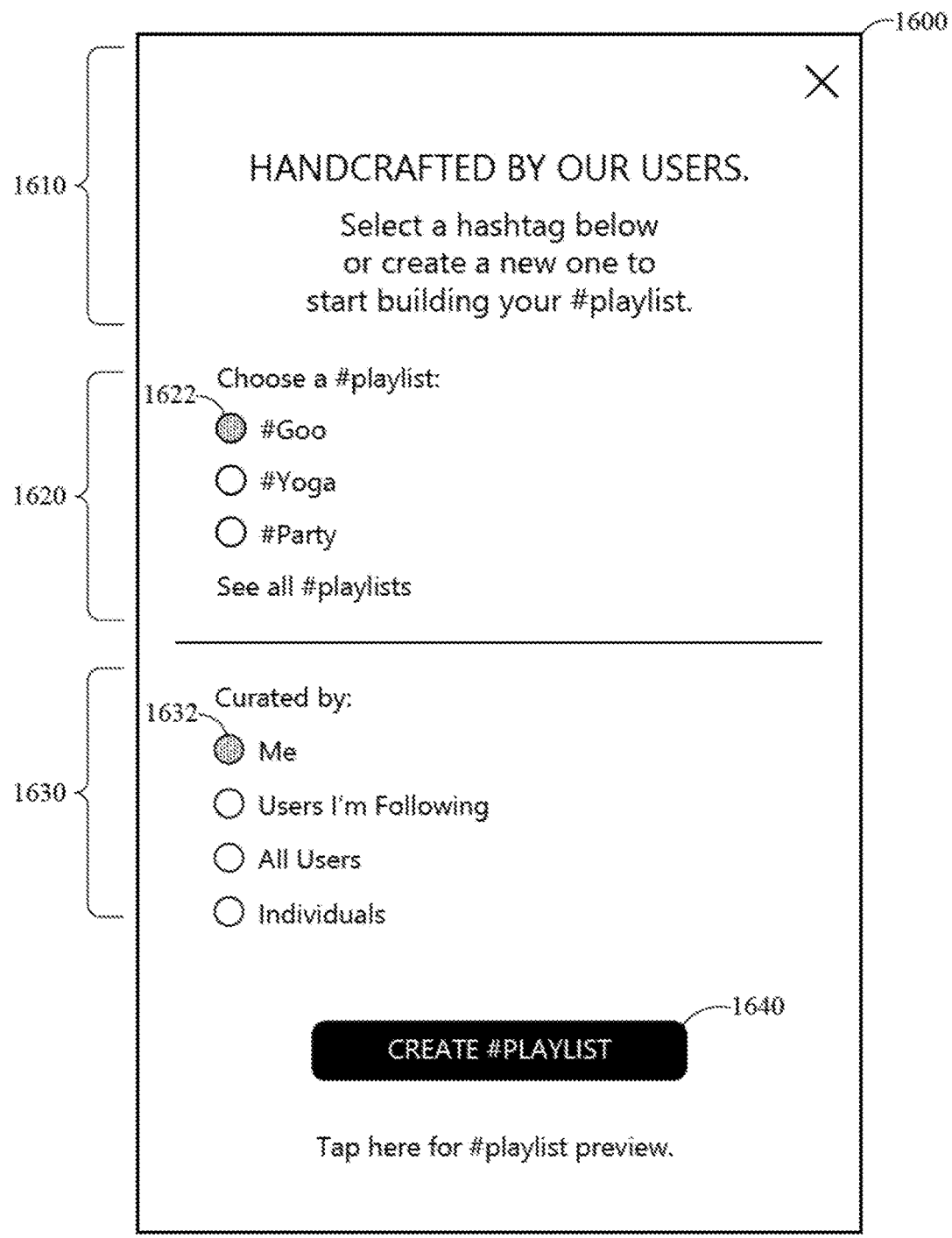
FIG. 16 shows an example of a user interface for hashtag-playlist generation with a novel hashtag-playlist 1600 in accordance with implementations of this disclosure.

FIG. 16 shows an example of a user interface for hashtag-playlist generation with a novel hashtag-playlist 1600 in accordance with implementations of this disclosure. The user interface for hashtag-playlist generation with a novel hashtag-playlist 1600 may be similar to the user interface for selecting a hashtag-playlist 1200 shown in FIG. 12, except as described herein. The user interface for hashtag-playlist generation with a novel hashtag-playlist 1600 may be presented in response to receiving information indicating a selection of, or a request for, the user interface for hashtag-playlist generation with a novel hashtag-playlist 1600, such as in response to receiving information indicating input, such as user input, selecting the user interface for hashtag-playlist generation with a novel hashtag-playlist 1600 via another user interface, such as novel hashtag-playlist search user interface 1500 shown in FIG. 15.

As shown in FIG. 16, the user interface for hashtag-playlist generation with a novel hashtag-playlist 1600 includes a descriptive portion 1610, a hashtag-playlist control portion 1620, a content curator control portion 1630, and a hashtag-playlist generation control 1640.

The hashtag-playlist control portion 1620 includes a selected hashtag-playlist indication control with a novel hashtag-playlist 1622, as indicated by the stippled background at 1622. The content curator control portion 1630 includes a selected content curator control 1632, as indicated by the stippled background at 1632, which may correspond with the user of the user interface for hashtag-playlist generation with a novel hashtag-playlist 1600 or an account associated with the use of the user interface for hashtag-playlist generation with a novel hashtag-playlist 1600.

In some embodiments, one or more of the content curator controls, other than the "Me" content curator control 1632, may correspond with an unavailable content curator and may be omitted from or disabled in the user interface for hashtag-playlist generation with a novel hashtag-playlist 1600.

A hashtag-playlist, such as a '#Goo' hashtag-playlist, may be generated in response to receiving information indicating input, such as user input, selecting the hashtag-playlist generation control 1640. In some embodiments, the selected content curator control selected at 1630 may be associated with unavailable content curators, generating the hashtag-playlist in response to receiving information indicating input selecting the hashtag-playlist generation control 1640 may be omitted and in response to receiving information indicating input selecting the hashtag-playlist generation control 1640 information indicating that content for the combination of #playlist and content curator identified is unavailable may be presented.

Figure 17:
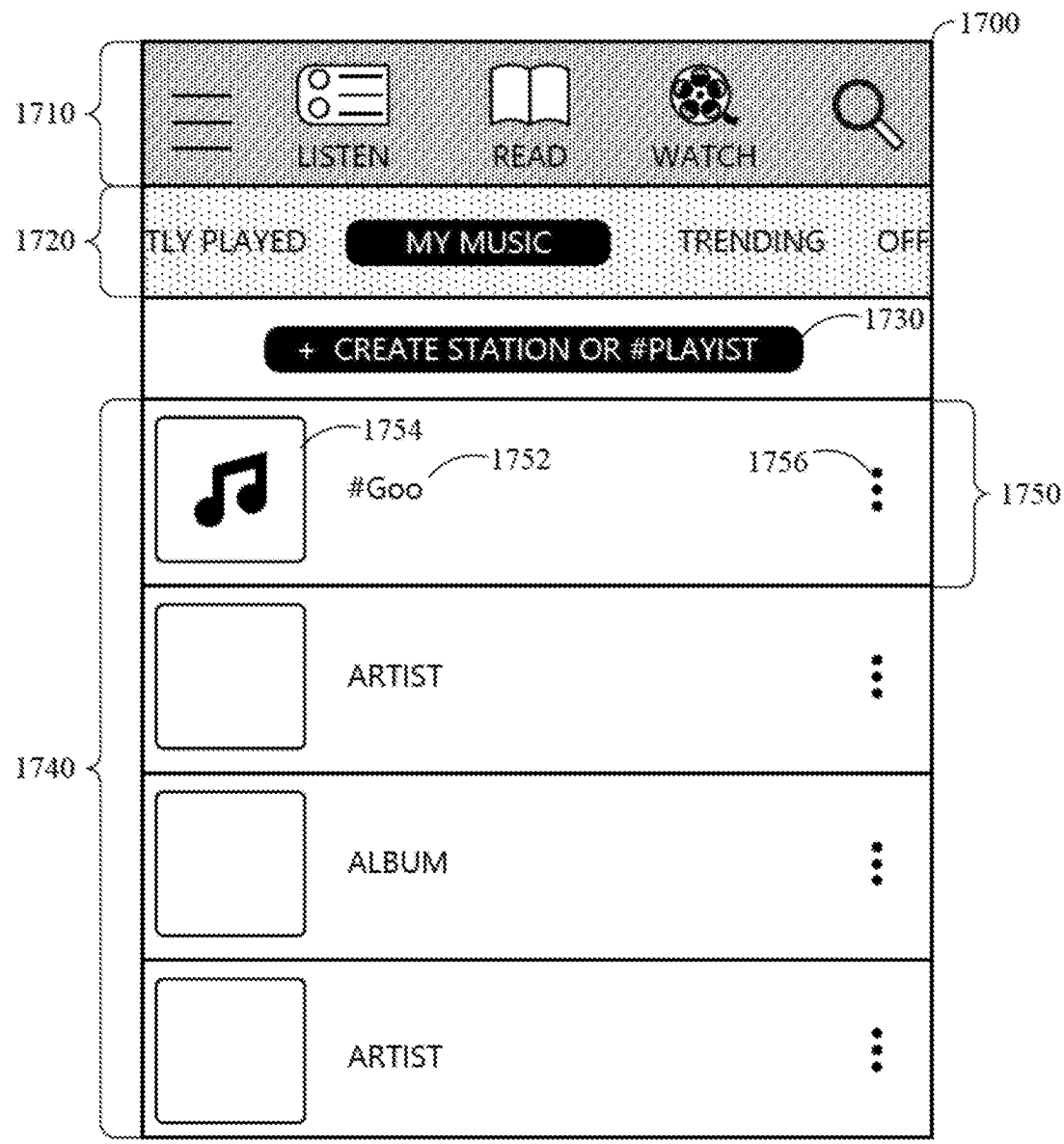
FIG. 17 shows an example of a user interface for listing content sequences including a novel hashtag-playlist 1700 in accordance with implementations of this disclosure.

FIG. 17 shows an example of a user interface for listing content sequences including a novel hashtag-playlist 1700 in accordance with implementations of this disclosure. The user interface for listing content sequences including a novel hashtag-playlist 1700 may be similar to the user interface for listing content sequences including hashtag-playlists 1000 shown in FIG. 10, except as described herein. The user interface for listing content sequences including a novel hashtag-playlist 1700 may be presented in response to receiving information indicating a selection of, or a request for, the user interface for listing content sequences including a novel hashtag-playlist 1700, such as in response to receiving information indicating input, such as user input, indicating a request to generate or create a hashtag-playlist, such as the '#Goo' hashtag-playlist, via another user interface, such as user interface for hashtag-playlist generation with a novel hashtag-playlist 1600 shown in FIG. 16.

As shown in FIG. 17, the user interface for listing content sequences including a novel hashtag-playlist 1700 includes an activity control portion 1710, a content-space portion 1720, a create sequence control 1730, and a content sequences list portion 1740.

The content sequences list portion 1740 includes a content sequence portion 1750 representing a hashtag-playlist, which may be a novel hashtag-playlist, such as the '#Goo' hashtag-playlist described in association with FIG. 16. The content sequence portion 1750 includes the name, '#Goo', of the hashtag-playlist 1752, a defined unpopulated hashtag-playlist icon 1754, and a hashtag-playlist control 1756.

In response to receiving information indicating a selection of the hashtag-playlist control 1756, such as in response to receiving information indicating input, such as user input, selecting the hashtag-playlist control 1756, a user interface for managing the hashtag-playlist may be presented. An example of a user interface for managing a hashtag-playlist is shown in FIG. 18.

Figure 18:
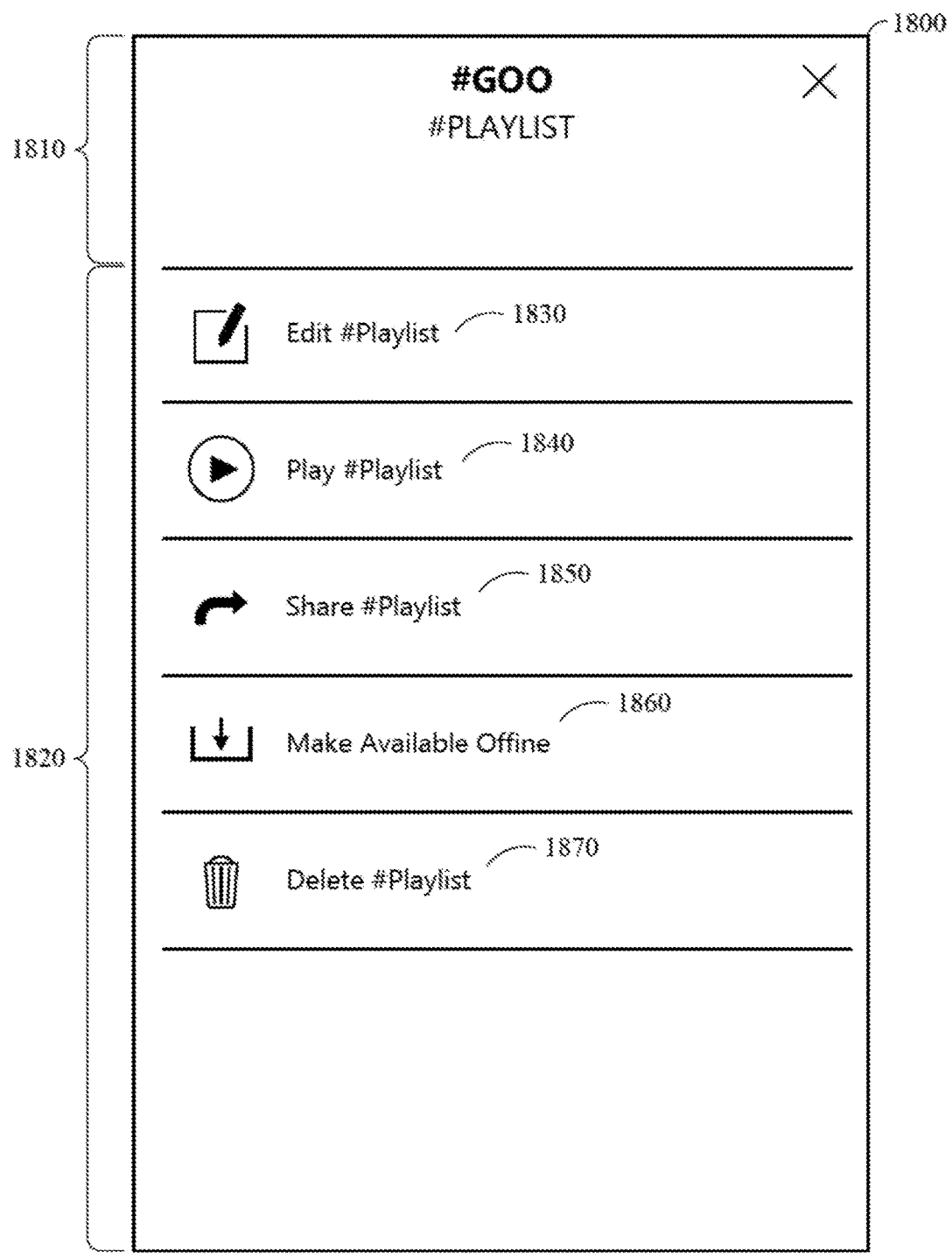
FIG. 18 shows an example of a user interface for managing a hashtag-playlist 1800 in accordance with implementations of this disclosure.

FIG. 18 shows an example of a user interface for managing a hashtag-playlist 1800 in accordance with implementations of this disclosure. The user interface for managing a hashtag-playlist 1800 may be presented in response to receiving information indicating a selection of, or a request for, the user interface for managing a hashtag-playlist 1800, such as in response to receiving information indicating input, such as user input, selecting the user interface for managing a hashtag-playlist 1800 via another user interface. For example, the user interface for managing a hashtag-playlist 1800 may be presented in response to receiving information indicating a selection of the hashtag-playlist control 1756 of the user interface for listing content sequences including a novel hashtag-playlist 1700 shown in FIG. 17 or a hashtag-playlist control for an identified hashtag-playlist via the user interface for listing content sequences including hashtag-playlists 1000 shown in FIG. 10.

As shown, the user interface for managing a hashtag-playlist 1800 includes a descriptive portion 1810, and a hashtag-playlist controls portion 1820. The descriptive portion 1810 includes a name, or other description, for the hashtag-playlist, such as '#Goo'. The descriptive portion 1810 may include one or more controls for controlling the user interface for managing a hashtag-playlist 1800.

The hashtag-playlist controls portion 1820 may include hashtag-playlist control portions for the current or target hashtag-playlist indicated in the descriptive portion 1810.

For example, the current or target hashtag-playlist indicated in the descriptive portion 1810 may be a hashtag-playlist created in response to input from a current user of the user interface for managing a hashtag-playlist 1800 or otherwise associated with information identifying the current user of, or a current account associated with using, the user interface for managing a hashtag-playlist 1800, such as the '#Goo' hashtag-playlist as shown, and the hashtag-playlist controls portion 1820 may include an edit hashtag-playlist control portion 1830, a play hashtag-playlist control portion 1840, a share hashtag-playlist control portion 1850, an offline access hashtag-playlist control portion 1860, and a delete hashtag-playlist control portion 1870 as shown.

In another example (not shown), the current or target hashtag-playlist indicated in the descriptive portion 1810 may be a hashtag-playlist created in response to input from a user other than the current user of the user interface for managing a hashtag-playlist 1800 or otherwise associated with information identifying a user or account other than the current user of the user interface for managing a hashtag-playlist 1800, and the hashtag-playlist controls portion 1820 may include an add control portion (not shown), which may be labeled 'Add to My Music', the play hashtag-playlist control portion 1840, the share hashtag-playlist control portion 1850, and the offline access hashtag-playlist control portion 1860. The edit hashtag-playlist control portion 1830 and the delete hashtag-playlist control portion 1870 may be omitted.

In response to receiving information indicating a selection of the edit hashtag-playlist control portion 1830, such as in response to receiving information indicating input, such as user input, selecting the edit hashtag-playlist control portion 1830, a user interface for editing or managing a hashtag-playlist may be presented. An example of a user interface for editing or managing a hashtag-playlist is shown in FIG. 19.

Figure 19:
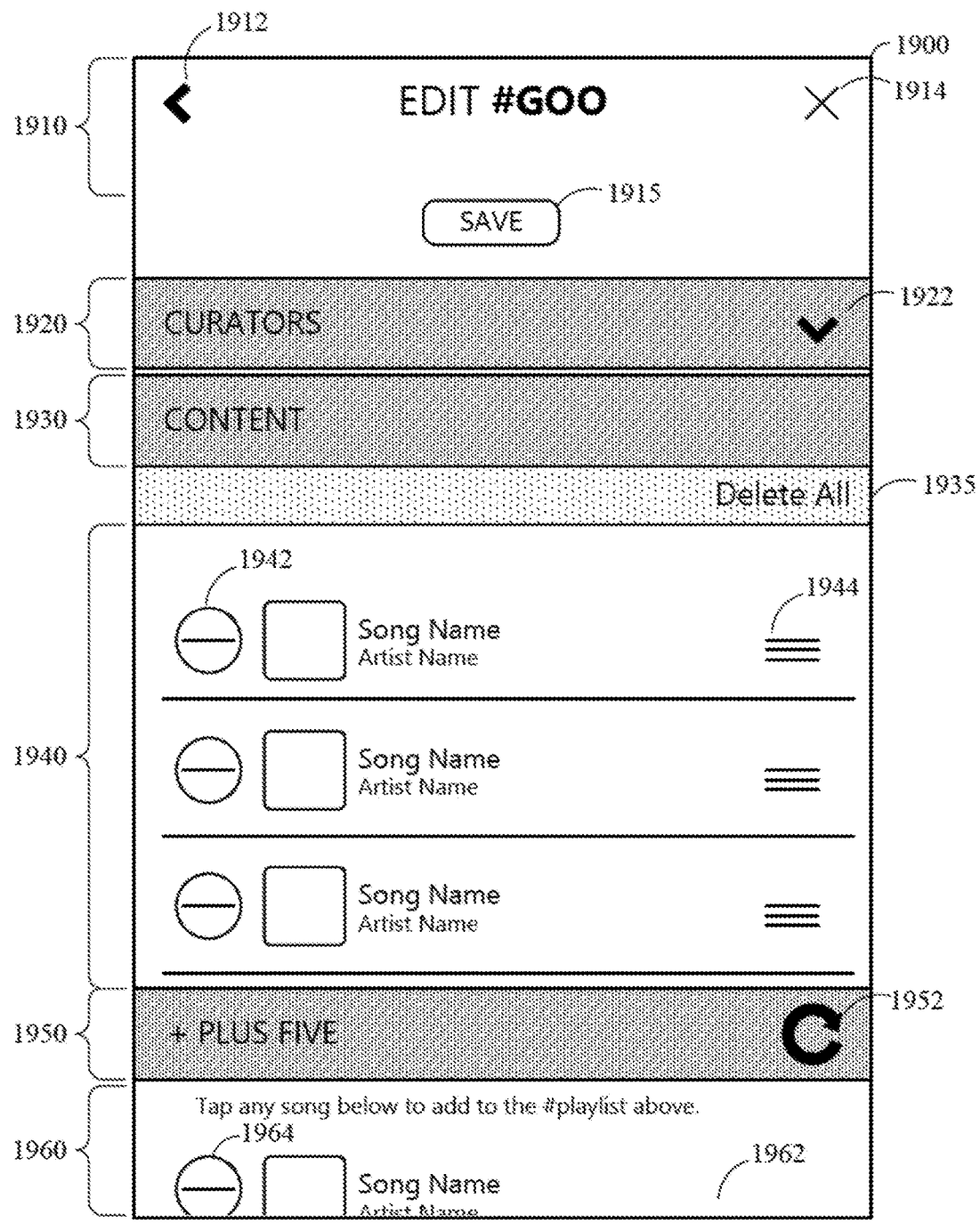
FIG. 19 shows an example of a user interface for editing or managing a hashtag-playlist 1900 in accordance with implementations of this disclosure.

FIG. 19 shows an example of a user interface for editing or managing a hashtag-playlist 1900 in accordance with implementations of this disclosure. The user interface for editing or managing a hashtag-playlist 1900 may be presented in response to receiving information indicating a selection of, or a request for, the user interface for editing or managing a hashtag-playlist 1900, such as in response to receiving information indicating input, such as user input, selecting the user interface for editing or managing a hashtag-playlist 1900 via another user interface, such as user interface for managing a hashtag-playlist 1800 shown in FIG. 18.

As shown in FIG. 19, the user interface for editing or managing a hashtag-playlist 1900 includes a descriptive portion 1910, a save control 1915, a curators control portion 1920, a songs control portion 1930, a clear control 1935, a content list portion 1940, a plus-five portion 1950, and a plus-five list portion 1960.

The descriptive portion 1910 may include a name, or other description, for the hashtag-playlist, such as '#Goo', and one or more user interface controls 1912, 1914. The descriptive portion 1910 may include one or more controls for controlling the user interface for editing or managing a hashtag-playlist 1900.

In response to receiving information indicating a selection of the save control 1915, such as in response to receiving information indicating input, such as user input, selecting the save control 1915, information representing the current hashtag-playlist, such as information as shown in the user interface for editing or managing a hashtag-playlist 1900, may be stored, or output for storage, in association with the hashtag-playlist, which may include overwriting, replacing, or removing information previously stored for the hashtag-playlist.

The curators control portion 1920 may include an expand curators control 1922 as shown. In response to receiving information indicating a selection of the expand curators control 1922, such as in response to receiving information indicating input, such as user input, selecting the expand curators control 1922, the curators control portion 1920 may be expanded to present an expanded curators control portion (not shown) including a list of content curators for the hashtag-playlist (not shown) and the expand curators control 1922 may be replaced with a contract curators control (not shown). Although not shown in FIG. 19, the content curators associated with the current hashtag-playlist may be managed, such as added, removed, ordered, or otherwise modified in the expanded curators control portion.

In response to receiving information indicating a selection of the clear control 1935, such as in response to receiving information indicating input, such as user input, selecting the clear control 1935, the content shown in the content list portion 1940 may be removed from the content list portion 1940. In some embodiments, in response to receiving information indicating a selection of the clear control 1935 a confirmation request may be presented, and the content shown in the content list portion 1940 may be removed from the content list portion 1940 in response to receiving input, such as user input, confirming the clear request.

The content list portion 1940 may include a list, such as an ordered list, of content, such as songs, associated with the hashtag-playlist. Although not expressly shown in FIG. 19, the content list portion 1940 may be scrollable. For each content object, or song, in the content list portion 1940, the content list portion 1940 may include a corresponding remove content control 1942, a corresponding list-order control 1944, or both. In response to receiving information indicating a selection of the remove content control 1942 corresponding to a content object, such as in response to receiving information indicating input, such as user input, selecting the remove content control 1942 corresponding to a content object, the content object may be removed from the content list portion 1940. In response to receiving information indicating a selection of the list-order control 1944 corresponding to a content object, such as in response to receiving information indicating input, such as user input, selecting the list-order control 1944 corresponding to a content object, the content object may relative order of the content object in the content list portion 1940 may be updated or changed as indicated by the user input information.

The plus-five list portion 1960 may include a list, such as an ordered list, of plus-five content objects 1962, such as songs, other than the content associated with the hashtag-playlist. Although a portion of one plus-five content object 1962 is shown in FIG. 19, the number, or cardinality, of plus-five content objects included in the plus-five list portion 1960 may be a defined value, such as five. The plus-five content objects 1962 included in the plus-five list portion 1960 may be identified based on one or more recommendation metrics, or a combination of recommendation metrics, such as the content associated with the hashtag-playlist, currently trending content, or the like. Although not expressly shown in FIG. 19, the plus-five list portion 1960 may be scrollable.

In response to receiving information indicating a selection of a plus-five content object 1962, such as in response to receiving information indicating input, such as user input, selecting a plus-five content object 1962, a corresponding content object may be included in the content list portion 1940, the plus-five content object 1962 may be omitted from the plus-five list portion 1960, and another plus-five content object may be included in the plus-five list portion 1960.

In response to receiving information indicating a selection of the remove content control 1964 corresponding to a plus-five content object 1962, such as in response to receiving information indicating input, such as user input, selecting the remove content control 1964 corresponding to a plus-five content object 1962, the plus-five content object may be removed from the plus-five list portion 1960.

The plus-five portion 1950 may include a plus-five refresh control 1952. In response to receiving information indicating a selection of the plus-five refresh control 1952, the content objects 1962 included in the plus-five list portion 1960 may be omitted from the plus-five list portion 1960 and other content objects, such as five different content objects, may be included in the plus-five list portion 1960.

Although not shown in FIG. 19, the user interface for editing or managing a hashtag-playlist 1900 may include a copy content control. In response to receiving information indicating a selection of the copy content control, such as in response to receiving information indicating input, such as user input, selecting the copy content control, a user interface for selecting a hashtag-playlist, such as the user interface for selecting a hashtag-playlist 1200 shown in FIG. 12, may be presented, and information indicating the content corresponding to the hashtag-playlist indicated in the user interface for editing or managing a hashtag-playlist 1900 may be output to the user interface for selecting a hashtag-playlist, such that, in response to receiving information indicating a selection of a hashtag-playlist via the user interface for selecting a hashtag-playlist, such as in response to receiving information indicating input, such as user input, selecting the hashtag-playlist, the content corresponding to the hashtag-playlist indicated in the user interface for editing or managing a hashtag-playlist 1900 may be included in the hashtag-playlist selected via the user interface for selecting a hashtag-playlist.

Figure 20:
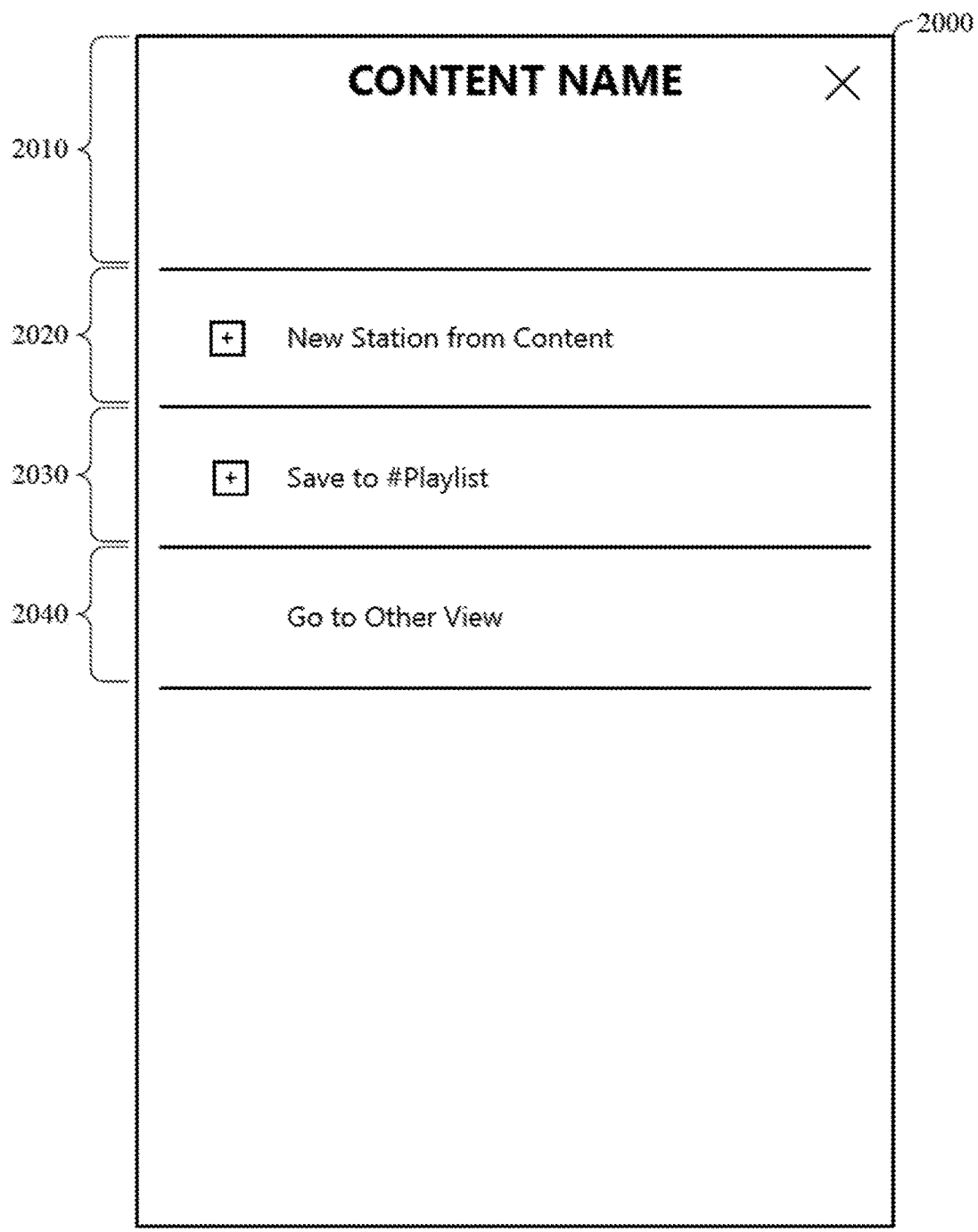
FIG. 20 shows an example of a user interface for accessing options for content 2000 in accordance with implementations of this disclosure.

FIG. 20 shows an example of a user interface for accessing options for content 2000 in accordance with implementations of this disclosure. The user interface for accessing options for content 2000 may be presented in response to receiving information indicating a selection of, or a request for, the user interface for accessing options for content 2000, such as in response to receiving information indicating input, such as user input, selecting the user interface for accessing options for content 2000 via another user interface, such as in response to receiving information indicating input, such as user input, selecting an access content options control.

Presenting the user interface for accessing options for content 2000 may include receiving, or otherwise accessing or maintaining, information indicating a current or identified content object or content group.

A content group may be a grouping or collection of content objects identifiable based on a defined metric for grouping content based on defined data identifying one or more relationships between the content and the defined content group. For example, a defined content group may correspond with an album and may include songs associated with the album. In another example, a defined content group may correspond with an artist and may include albums, songs, or both, associated with the artist.

For example, a user interface indicating one or more content objects may include an access content options control associated with a respective content object and the user interface for accessing options for content 2000 may be presented in response to receiving information indicating input, such as user input, selecting the access content options control.

In another example, a user interface indicating one or more defined content groups may include an access content group options control associated with a respective content group and the user interface for accessing options for content 2000 may be presented in response to receiving information indicating input, such as user input, selecting the access content group options control.

As shown, the user interface for accessing options for content 2000 includes a descriptive portion 2010, an access station generation control portion 2020, an associate with hashtag-playlist control portion 2030, and a content group view control portion 2040.

The descriptive portion 2010 may include a name, or other description, for the identified content object or content group. The descriptive portion 2010 may include one or more controls for controlling the user interface for accessing options for content 2000.

In response to receiving information indicating a selection of the access station generation control portion 2020 a user interface for creating a station based on the identified content object or content group may be presented.

In response to receiving information indicating a selection of the associate with hashtag-playlist control portion 2030 a user interface for including the content object or content group indicated by the descriptive portion 2010 in a hashtag-playlist may be presented. An example of user interface for including indicated content in a hashtag-playlist is shown in FIG. 21.

In response to receiving information indicating a selection of the content group view control portion 2040 a user interface for accessing a content group may be presented. An example of a user interface for accessing a content group is shown in FIG. 22. The label or other representation of the content group view control portion 2040 shown in the user interface for accessing options for content 2000 may be identified based on the content object or content group indicated by the descriptive portion 2010. For example, the content object or content group indicated by the descriptive portion 2010 may be a song and the label or other representation of the content group view control portion 2040 shown in the user interface for accessing options for content 2000 may be "Go to Album View," or the content object or content group indicated by the descriptive portion 2010 may be an album and the label or other representation of the content group view control portion 2040 shown in the user interface for accessing options for content 2000 may be "Go to Artist View."

Figure 21:
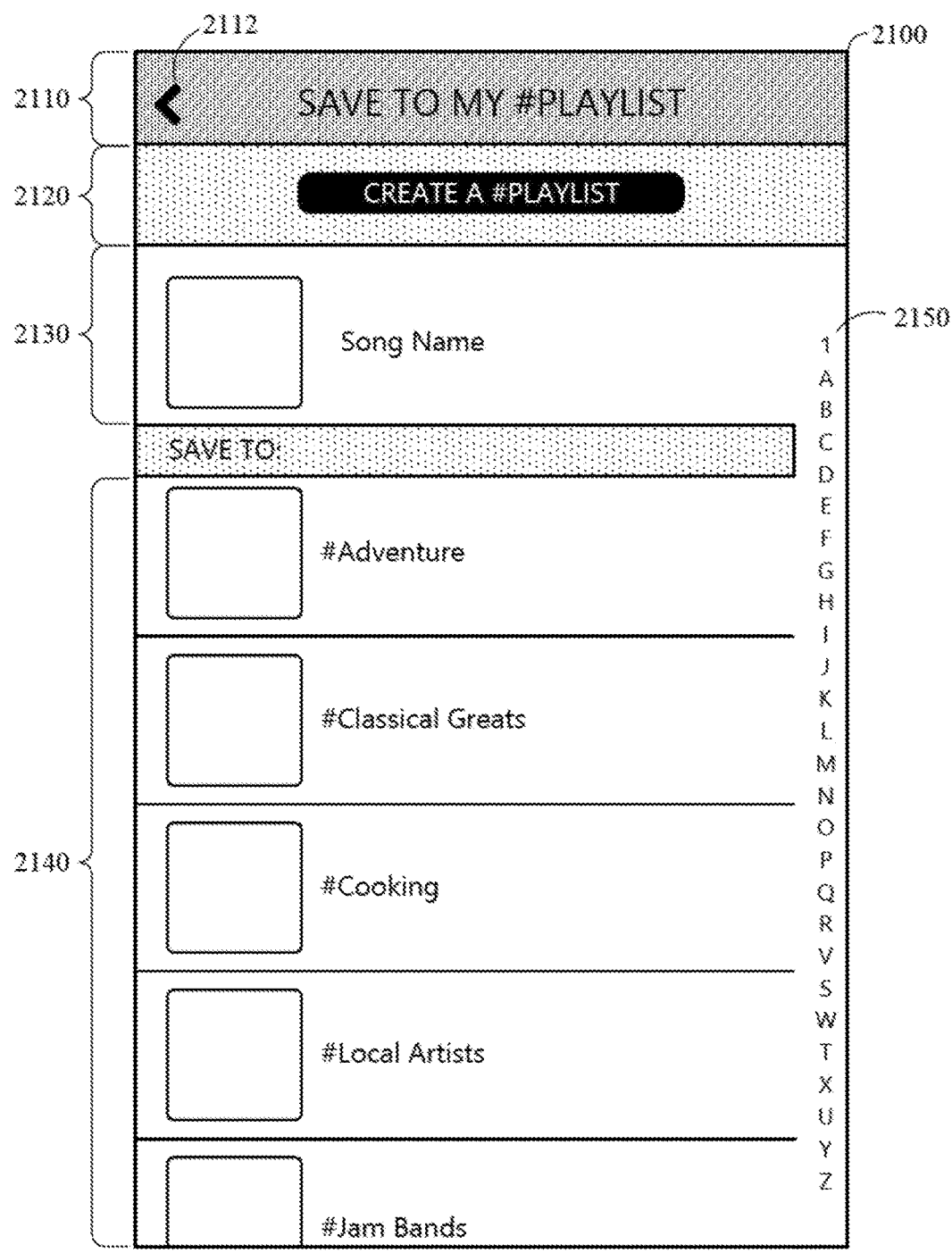
FIG. 21 shows an example of a user interface for including an identified content object in a hashtag-playlist 2100 in accordance with implementations of this disclosure.

FIG. 21 shows an example of a user interface for including an identified content object in a hashtag-playlist 2100 in accordance with implementations of this disclosure. The user interface for including an identified content object in a hashtag-playlist 2100 may be presented in response to receiving information indicating a selection of, or a request for, the user interface for including an identified content object in a hashtag-playlist 2100, such as in response to receiving information indicating input, such as user input, selecting the user interface for including an identified content object in a hashtag-playlist 2100 via another user interface, such as the user interface for accessing options for content 2000 shown in FIG. 20.

Presenting the user interface for including an identified content object in a hashtag-playlist 2100 may include receiving, or otherwise accessing or maintaining, information indicating a current or identified content object or content group.

The user interface for including an identified content object in a hashtag-playlist 2100 includes a descriptive portion 2110, a create hashtag-playlist control 2120, an identified content object portion 2130, a hashtag-playlist list portion 2140, and an alpha index control 2150.

The descriptive portion 2110 may include a description of the features and functions of the user interface for including an identified content object in a hashtag-playlist 2100 and one or more user interface controls 2112.

In response to receiving information indicating a selection of the create hashtag-playlist control 2120, such as in response to receiving information indicating input, such as user input, selecting the create hashtag-playlist control 2120, a user interface for accessing hashtag-playlist generation based on an identified content object may be presented.

The identified content object portion 2130 may include a name, or other description, for the identified content object, or song, and a pictographic representation a of the identified content object, such as album art.

The hashtag-playlist list portion 2140 may include a list of previously generated hashtag-playlists, or a portion thereof, which may be ordered alpha-numerically, and which may be scrollable, such as in response to receiving input indicating user input, such as user input scrolling, swiping, or dragging vertically along the hashtag-playlist list portion 2140, or indicating a selection of a portion of the alpha index control 2150.

In response to receiving information indicating a selection of a hashtag-playlist, such as in response to receiving information indicating input, such as user input, selecting the hashtag-playlist from the hashtag-playlist list portion 2140, information indicating the inclusion of the identified content object in the selected hashtag-playlist may be output or stored.

FIG. 22 shows an example of a user interface for accessing a content group 2200 in accordance with implementations of this disclosure. The user interface for accessing a content group 2200 may be presented in response to receiving information indicating a selection of, or a request for, the user interface for accessing a content group 2200, such as in response to receiving information indicating input, such as user input, selecting the user interface for accessing a content group 2200 via another user interface, such as the content group view control portion 2040 shown in the user interface for accessing options for content 2000 shown in FIG. 20. Presenting the user interface for accessing a content group 2200 may include receiving, or otherwise accessing or maintaining, information indicating a current or identified content group.

As shown in FIG. 22, the user interface for accessing a content group 2200 includes a header portion 2210, a description portion 2220, a view control portion 2230, and a content or content groups list portion 2240.

The header portion 2210 includes a description of the features and functions of the user interface for accessing a content group 2200. For example, the content group may be an album, and the header portion 2210 may include a name of the album. In another example, the content group may be an artist, and the header portion 2210 may include a name of the artist. The header portion 2210 may include one or more controls for controlling the user interface for accessing a content group 2200.

The content control portion 2220 includes a description, including a title and artist, or author, for the currently active content object. The content control portion 2220 includes a pictographic representation 2224 of the current active content object, such as album art.

The description portion 2220 a pictographic representation of the content group. For example, the content group may be an album, and the pictographic representation of the content group may include album art. In another example, the content group may be an artist, and the pictographic representation of the content group may include a picture of the artist.

The description portion 2220 may include one or more controls 2222 for the content group. For example, the content group may be an album, and the controls 2222 for the content group may include a create station control for creating or generating a station based on the album. In another example, the content group may be an artist, and the controls 2222 for the content group may include a create station control for creating or generating a station based on the artist and a Socially Responsible control (not shown) for controlling a Social Responsibility setting associated with the artist.

The view control portion 2230 may include one or more controls 2232, 2234 for controlling the content or content groups list portion 2240, such as a group view control 2232, a similar group control 2234, or both.

In response to receiving information indicating a selection of the group view control 2232, such as in response to receiving information indicating input, such as user input, selecting the group view control 2232, the content or content groups list portion 2240 may present a list of content objects, or content groups, for the identified content group. For example, the content group may be an album, the group view control 2232 may indicate a cardinality of songs on the album, and in response to receiving information indicating a selection of the view control portion 2230 the content or content groups list portion 2240 may present a list of the songs on the album. In another example, the content group may be an artist, the group view control 2232 may indicate a cardinality of albums, or songs, by the artist, and in response to receiving information indicating a selection of the view control portion 2230 the content or content groups list portion 2240 may present a list of the albums, songs, or both by the artist.

In response to receiving information indicating a selection of the similar group control 2234, such as in response to receiving information indicating input, such as user input, selecting the similar group control 2234, the content or content groups list portion 2240 may present a list of similar content groups, based on a similarity to the identified content group. For example, the content group may be an album and in response to receiving information indicating a selection of the similar group control 2234 the content or content groups list portion 2240 may present a list of other albums similar to the identified album. In another example, the content group may be an artist and in response to receiving information indicating a selection of the similar group control 2234 the content or content groups list portion 2240 may present a list of other artists, similar to the identified artist.

Figure 23:
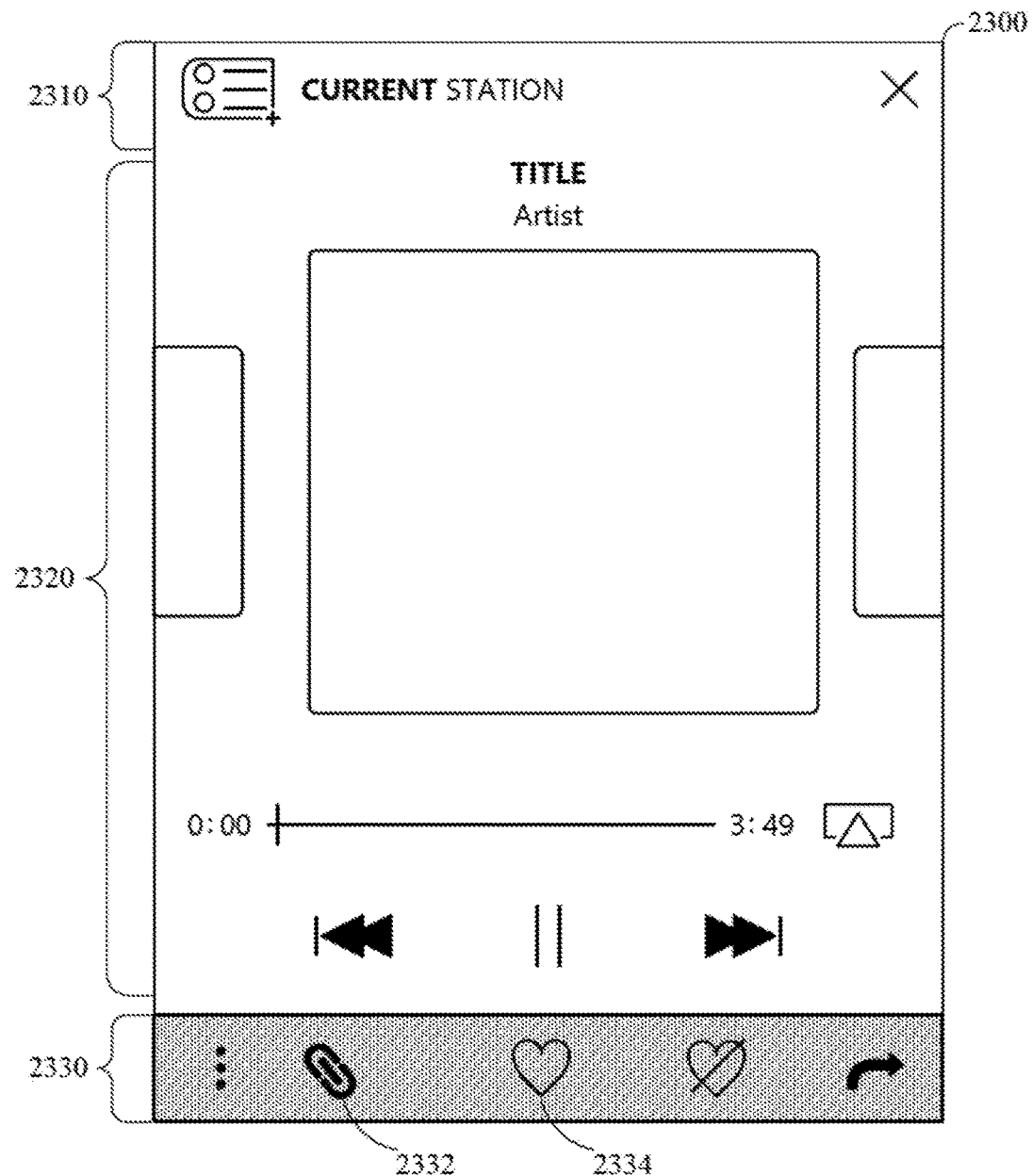
FIG. 23 shows an example of a user interface for accessing a content sequence 2300 in accordance with implementations of this disclosure.

FIG. 23 shows an example of a user interface for accessing a content sequence 2300 in accordance with implementations of this disclosure. The user interface for accessing a content sequence 2300 may be similar to the user interface 600 for managing a content sequence shown in FIG. 6, except as described herein. The user interface for accessing a content sequence 2300 may be presented in response to receiving information indicating a selection of, or a request for, the user interface for accessing a content sequence 2300, such as in response to receiving information indicating input, such as user input, selecting the user interface for accessing a content sequence 2300.

As shown, the user interface for accessing a content sequence 2300 includes a header portion 2310, a content control portion 2320, and a content sequence control portion 2330.

The header portion 2310 includes a description of the current content sequence and one or more user interface controls. The content control portion 2320 includes a description, including a title and artist, or author, for the currently active content object, a pictographic representation of the current active content object, such as album art, and one or more controls for controlling a presentation of the current active content object.

The content sequence control portion 2330 includes controls, such a connect content control 2332 and a positive content evaluation control 2334. In response to receiving information indicating a selection of the connect content control 2332 or the positive content evaluation control 2334, such as in response to receiving information indicating input, such as user input, selecting the connect content control 2332 or the positive content evaluation control 2334, a user interface for associating the current content with a hashtag-playlist may be presented. An example of a user interface for associating the current content with a hashtag-playlist is shown in FIG. 24.

Figure 24:
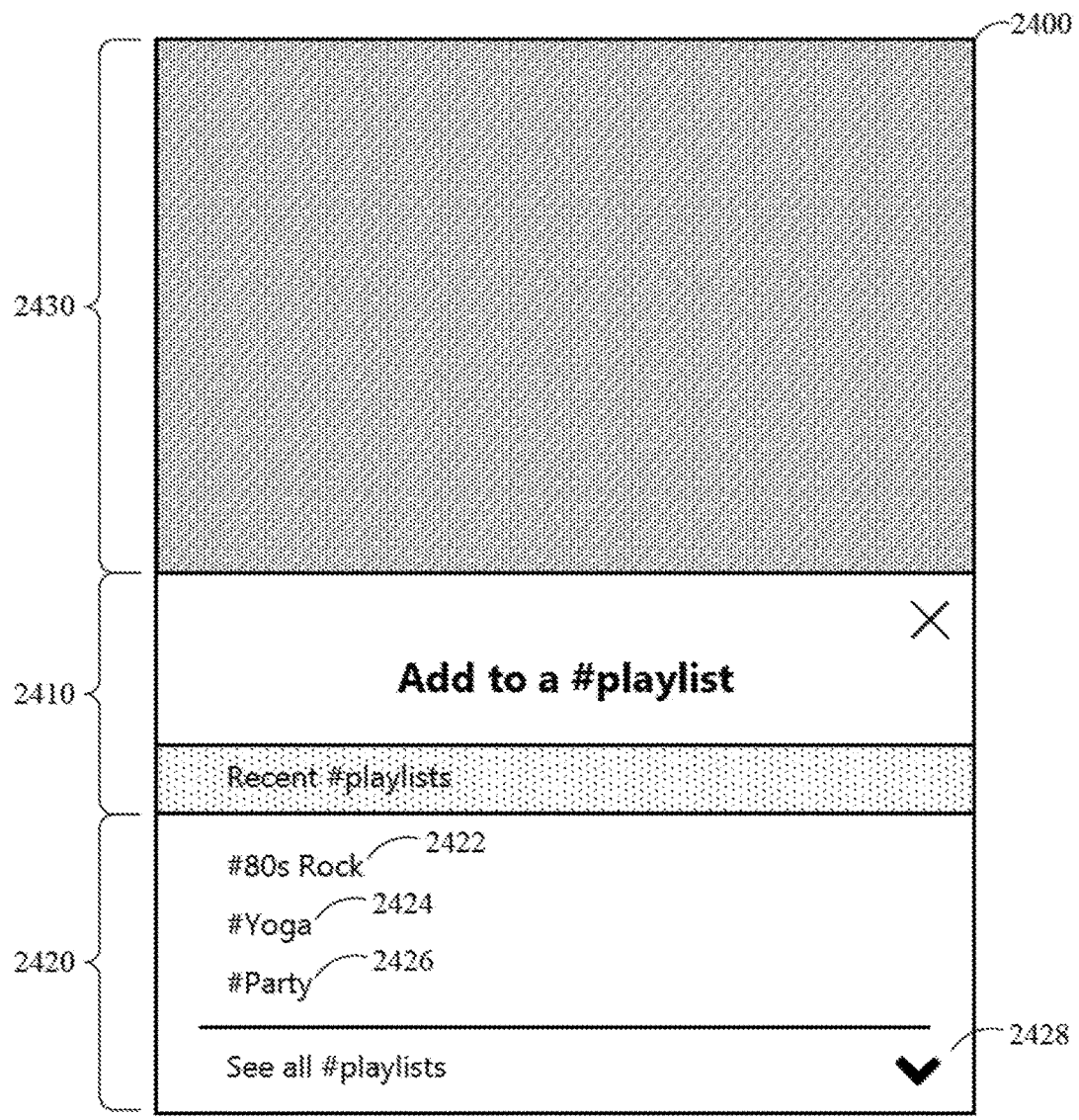
FIG. 24 shows an example of a user interface for associating identified content with a hashtag-playlist 2400 in accordance with implementations of this disclosure.

FIG. 24 shows an example of a user interface for associating identified content with a hashtag-playlist 2400 in accordance with implementations of this disclosure. The user interface for associating identified content with a hashtag-playlist 2400 may be presented in response to receiving information indicating a selection of, or a request for, the user interface for associating identified content with a hashtag-playlist 2400, such as in response to receiving information indicating input, such as user input, selecting the user interface for associating identified content with a hashtag-playlist 2400 via another user interface, such as the connect content control 2332 of the user interface for accessing a content sequence 2300 shown in FIG. 23.

As shown in FIG. 24, the user interface for associating identified content with a hashtag-playlist 2400 includes a header portion 2410, a hashtag-playlists control portion 2420, and a background portion 2430. Although not shown in FIG. 24, information indicating current or identified content, such as a current or identified song, may be associated with presenting the user interface for associating identified content with a hashtag-playlist 2400.

The header portion 2410 includes a description of the features and functions of the user interface for associating identified content with a hashtag-playlist 2400. The header portion 2410 may include one or more controls for controlling the user interface for associating identified content with a hashtag-playlist 2400.

The hashtag-playlists control portion 2420 may be similar to the hashtag-playlists control portion 1220 shown in FIG. 12, except as described herein. The hashtag-playlists control portion 2420 includes hashtag-playlist indication controls 2422, 2424, 2426, and an access hashtag-playlists control 2428.

In response to receiving information indicating a selection of a hashtag-playlist indication control 2422, 2424, 2426, such as in response to receiving information indicating input, such as user input, selecting the hashtag-playlist indication control 2422, 2424, 2426, information indicating an association between the identified content and the hashtag-playlist corresponding to the selected hashtag-playlist indication control 2422, 2424, 2426 may be output or stored, presentation of the user interface for associating identified content with a hashtag-playlist 2400 may cease, and a previously active user interface, such as the user interface for accessing a content sequence 2300 shown in FIG. 23, may be presented.

In response to receiving information indicating a selection of the access hashtag-playlists control 2428, such as in response to receiving information indicating input, such as user input, selecting the access hashtag-playlists control 2428, a user interface for listing hashtag-playlists may be presented. An example of a user interface for listing hashtag-playlists is shown in FIG. 13.

The background portion 2430 may include a portion of a recent or previous user interface, such as the user interface for accessing a content sequence 2300 shown in FIG. 23, which may be visually distinguished from the user interface for associating identified content with a hashtag-playlist 2400, such as greyed out, and may be inaccessible concurrent with presenting the user interface for associating identified content with a hashtag-playlist 2400.

These user interfaces described herein can provide various technique benefits. For instance, in the user interfaces can enable a computer system (e.g., a mobile device) to more effectively summarize and display particular subsets of information to a user (e.g., subsets of information relevant to generating content sequences based on specific criteria or rules), and receive user inputs (e.g., user commands or inputs that influence the generation of content sequences), particularly in a constrained environment (e.g., using a display screen of limited size). Accordingly, the computer system can be operated by a user in a more efficient and intuitive manner.

Figure 25:
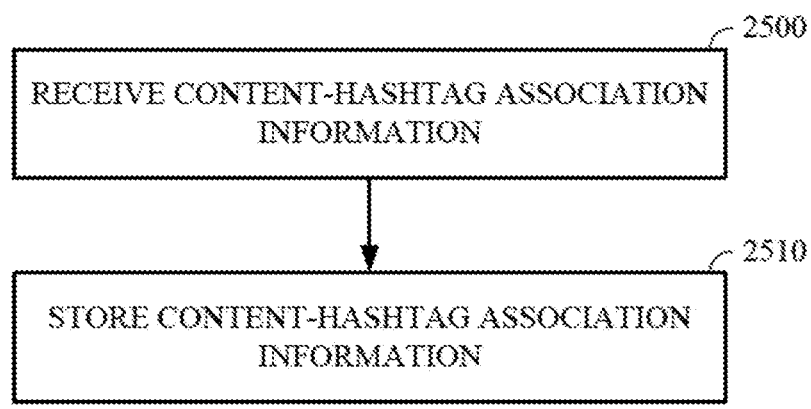
FIG. 25 is a flow diagram of an example of hashtagging content in accordance with embodiments of this disclosure.

FIG. 25 is a flow diagram of an example of hashtagging content in accordance with embodiments of this disclosure. Hashtagging content, which may include associating content with a hashtag-playlist, may be implemented in a user device, such as the customer device 114 shown in FIG. 1, which may communicate via a communication system, such as the Internet, or any other wired or wireless computer communication system or network. In some embodiments, hashtagging content may be implemented in a server device, such as the provider 120 shown in FIG. 1, which may communicate via a communication system, such as the Internet, or any other wired or wireless computer communication system or network. In some embodiments, hashtagging content may be implemented in a combination of a user device, such as the customer device 114 shown in FIG. 1 and a server device, such as the provider 120 shown in FIG. 1, which may communicate via a communication system, such as the Internet, or any other wired or wireless computer communication system or network.

The content hashtagging techniques described herein can be provide various technical benefits. For instance, as described herein (e.g., with respect to FIG. 2), content sequences can be generated in a manner that improves the functionality of computerized systems for storing, transmitting, and regulating access to digital content. An example, computer systems can automatically generate and exchange content sequences based on a user's preferences, by operating in accordance to one or more techniques, criteria, and rules. Content hashtagging techniques can facilitate the automatic generation and exchange of these content sequences (e.g., by enabling a computer system to automatically interpret contextual information regarding a number of different content items based on collected information, and select particular content items for inclusion in content sequences based on the interpretation).

Hashtagging content may include receiving information indicating a content-hashtag-playlist association at 2500, storing content-hashtag-playlist association information at 2510, or a combination thereof.

Information indicating a content-hashtag-playlist association may be received at 2500. For example, the information indicating the content-hashtag-playlist association may be received in response to user input, such as user input selecting content and a hashtag-playlist via a user interface, such as the user interface 1300 shown in FIG. 13, the user interface 1900 shown in FIG. 19, the user interface 2100 shown in FIG. 21, or the user interface 2400 shown in FIG. 24. The information indicating the content-hashtag-playlist association may include information indicating the content, such as a unique content identifier, information indicating the hashtag-playlist, such as a unique hashtag-playlist identifier, or both. The information indicating the content may identify a unique content object, or a group or collection of content objects, such as an album, a set of content indicating a defined artist, or the like.

In some embodiments, the information indicating the content-hashtag-playlist association may include information identifying a user, user account, customer, customer account, customer system, customer device, or a combination thereof, associated with generating the content-hashtag-playlist association.

The content-hashtag-playlist association information may be stored at 2510. For example, a device, such as the customer device 114 shown in FIG. 1, the provider 120 shown in FIG. 1, the license manager 140 shown in FIG. 1, or a combination thereof, may store the content-hashtag-playlist association information. In some embodiments, storing the content-hashtag-playlist association information at 2510 may include storing, such as in a record, information indicating the content-hashtag-playlist association information received at 2500.

In some embodiments, storing the content-hashtag-playlist association information at 2510 may include storing information indicating a content curator associated with the content-hashtag-playlist association. For example, the user indicated by the content-hashtag-playlist association information received at 2500 may be identified as the content curator.

Storing the content-hashtag-playlist association information may include generating a content-hashtag-playlist association message, sending the content-hashtag-playlist association message, or both. For example, a user device presenting a user interface may receive the content-hashtag-playlist association information, may generate a corresponding content-hashtag-playlist association message including the content-hashtag-playlist association information, or a portion thereof, and may transmit the content-hashtag-playlist association message to an external device or server, such as the provider, the license manager, or both. The external device or server may receive the content-hashtag-playlist association message and may store the corresponding content-hashtag-playlist association information. In some embodiments, the information indicating the hashtag-playlist may be omitted, information indicating a hashtag, independent of a hashtag playlist may be included, and an association between the content and the hashtag may be stored.

Figure 26:
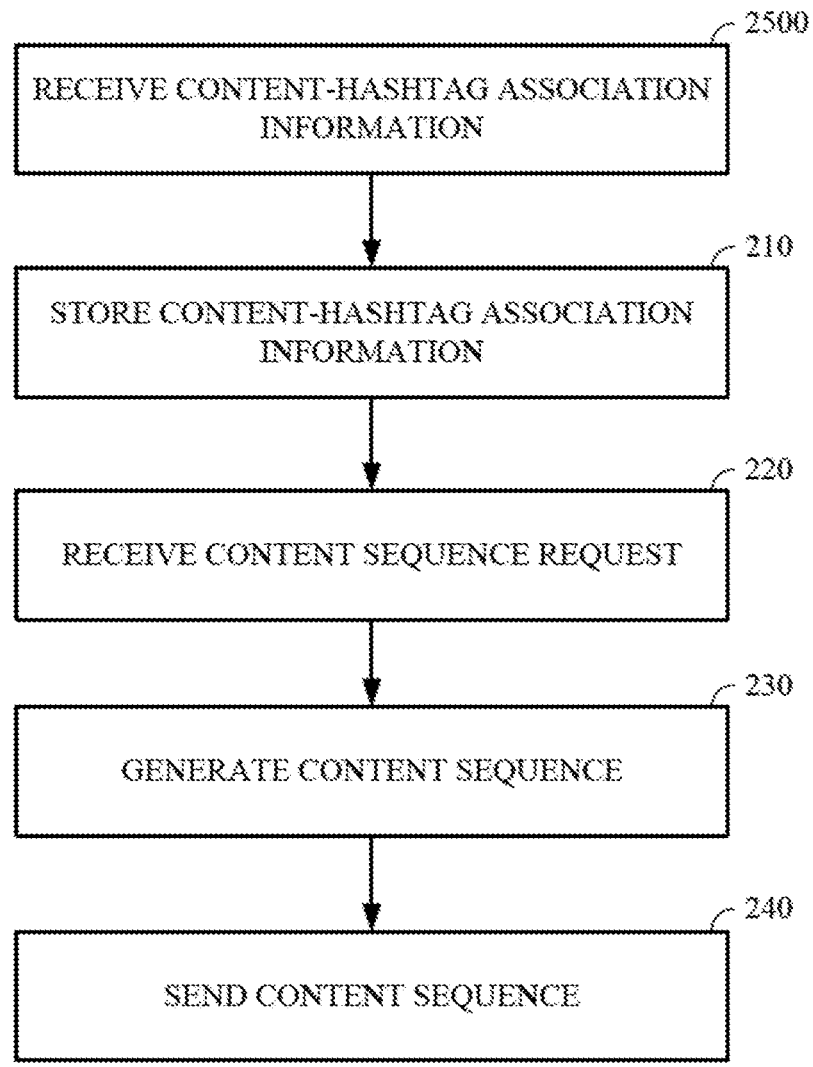
FIG. 26 is a flow diagram of an example of generating a hashtag-playlist in accordance with embodiments of this disclosure.

FIG. 26 is a flow diagram of an example of generating a hashtag-playlist in accordance with embodiments of this disclosure. Generating a hashtag-playlist may be implemented in a user device, such as the customer device 114 shown in FIG. 1, which may communicate via a communication system, such as the Internet, or any other wired or wireless computer communication system or network. In some embodiments, generating a hashtag-playlist may be implemented in a server device, such as the provider 120 shown in FIG. 1, which may communicate via a communication system, such as the Internet, or any other wired or wireless computer communication system or network. In some embodiments, generating a hashtag-playlist may be implemented in a combination of a user device, such as the customer device 114 shown in FIG. 1 and a server device, such as the provider 120 shown in FIG. 1, which may communicate via a communication system, such as the Internet, or any other wired or wireless computer communication system or network.

Generating a hashtag-playlist may include receiving information indicating a hashtag-playlist at 2600, storing information indicating the hashtag-playlist at 2610, or a combination thereof.

Information indicating a hashtag-playlist may be received at 2600. For example, the information indicating the hashtag-playlist may be received in response to user input, such as user input selecting a create playlist control, such as the create playlist control 1240 shown in FIG. 12 or the create playlist control 1640 shown in FIG. 16.

The information indicating the hashtag-playlist may include information uniquely identifying the hashtag-playlist, such as a unique hashtag-playlist identifier, such as a unique name for the hashtag-playlist.

In some embodiments, the information indicating the hashtag-playlist may include information identifying a user, user account, customer, customer account, customer system, customer device, or a combination thereof, associated with generating the hashtag-playlist.

In some embodiments, the information indicating the hashtag-playlist may include information identifying a content curator for the hashtag-playlist. For example, the hashtag-playlist may be a novel hashtag-playlist and the information identifying the content curator may include information identifying the user, user account, customer, customer account, customer system, customer device, or a combination thereof, associated with generating the hashtag-playlist.

The hashtag-playlist information may be stored at 2610. For example, a device, such as the customer device 114 shown in FIG. 1, the provider 120 shown in FIG. 1, the license manager 140 shown in FIG. 1, or a combination thereof, may store the hashtag-playlist information. In some embodiments, storing the hashtag-playlist information at 2610 may include storing, such as in a record, information indicating the hashtag-playlist information received at 2600.

Storing the hashtag-playlist information may include generating a hashtag-playlist message, sending the hashtag-playlist message, or both. For example, a user device presenting a user interface may receive the hashtag-playlist information, may generate a corresponding hashtag-playlist message including the hashtag-playlist information, or a portion thereof, and may transmit the hashtag-playlist message to an external device or server, such as the provider, the license manager, or both. The external device or server may receive the hashtag-playlist message and may store the corresponding hashtag-playlist information.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   receiving, at a first device from a second device via a first electronic communication link, a hashtag-playlist generation request message, the hashtag-playlist generation request message including a hashtag-playlist indicator and a first content curator indicator, the hashtag-playlist indicator identifying a hashtag-playlist, and the first content curator indicator indicating a first content curator;
   in response to a determination that a previously generated hashtag-playlist corresponding to the hashtag-playlist indicator is unavailable, storing, by a processor of the first device in response to instructions stored on a non-transitory computer readable medium of the first device, hashtag-playlist information indicating an association between the hashtag-playlist indicator and the first content curator indicator, wherein storing the hashtag-playlist information includes generating the hashtag-playlist information;
   receiving, at the first device from a third device via a second electronic communication link, a request for a sequence of content, wherein the request for the sequence of content includes the hashtag-playlist indicator and a user account indicator identifying a user account;
   generating, by the processor in response to the instructions stored on the non-transitory computer readable medium, the sequence of content, wherein generating the sequence of content includes:
      identifying hashtag-playlist content objects, wherein each respective content object from the hashtag-playlist content objects is identified based on information indicating a defined association between the respective content object and the hashtag-playlist identifier,
      including at least one content object from the hashtag-playlist content objects in the sequence of content,
      identifying a first set of additional hashtag-playlist content objects, wherein each respective content object from the first set of additional hashtag-playlist content objects is not associated with the hashtag-playlist identifier,
      causing the first set of additional hashtag-playlist content objects to be displayed on third device,
      receiving, at the first device from the third device, a first user input selecting one of the content object from the first set of additional hashtag-playlist content objects for inclusion in the sequence of content, and
      responsive to receiving the first user input selecting one of the content object from the first set of additional hashtag-playlist content objects for inclusion in the sequence of content, adding the selected content object in the sequence of content and associated the selected content object with the hashtag-playlist identifier; and
   transmitting at least one content object from the sequence of content for presentation to a user associated with the user account.

2. The method of claim 1, wherein storing the hashtag-playlist information includes:
   in response to a determination that the hashtag-playlist generation request message includes a source hashtag-playlist indicator, storing the information indicating the defined association for each content object from a plurality of content objects associated with a source hashtag-playlist indicated by the source hashtag-playlist indicator.

3. The method of claim 1, further comprising:
   receiving, at the first device from a fourth device via a third electronic communication link, a hashtag-playlist association request message, the hashtag-playlist association request message including the hashtag-playlist indicator, a content object indicator, and a second content curator indicator; and
   in response to a determination that previously generated hashtag-playlist association information indicating the defined association between the content object indicator, the second content curator indicator, and the hashtag-playlist indicator is unavailable, storing, by the processor of the first device in response to the instructions stored on the non-transitory computer readable medium of the first device, hashtag-playlist association information indicating the defined association between the hashtag-playlist indicator, the content object indicator, and the second content curator indicator, wherein storing the hashtag-playlist association information includes generating the hashtag-playlist association information.

4. The method of claim 1, wherein the content curator is the user, an identified user other than the user, a user from a plurality of users identified by the user, or a user from a plurality of users associated with an organization.

5. The method of claim 1, further comprising:
   identifying similar content objects wherein each respective content object from the similar content objects is identified based on a determined similarity metric value between the respective content object and the hashtag-playlist content objects; and
   including at least one content object from the similar content objects in the sequence of content.

6. An apparatus comprising:
   a non-transitory computer readable memory; and
   a processor configured to execute instructions stored in the memory to:
      receive, from an external device via a first electronic communication link, a hashtag-playlist generation request message, the hashtag-playlist generation request message including a hashtag-playlist indicator and a first content curator indicator, the hashtag-playlist indicator identifying a hashtag-playlist, and the first content curator indicator indicating a first content curator;

in response to a determination that a previously generated hashtag-playlist corresponding to the hashtag-playlist indicator is unavailable, store hashtag-playlist information indicating an association between the hashtag-playlist indicator and the first content curator indicator, wherein storing the hashtag-playlist information includes generating the hashtag-playlist information;

receive, from a third device via a second electronic communication link, a request for a sequence of content, wherein the request for the sequence of content includes the hashtag-playlist indicator and a user account indicator identifying a user account;

generate the sequence of content by:
identifying hashtag-playlist content objects, wherein each respective content object from the hashtag-playlist content objects is identified based on information indicating a defined association between the respective content object and the hashtag-playlist identifier,
including at least one content object from the hashtag-playlist content objects in the sequence of content
identifying a first set of additional hashtag-playlist content objects, wherein each respective content object from the first set of additional hashtag-playlist content objects is not associated with the hashtag-playlist identifier,
causing the first set of additional hashtag-playlist content objects to be displayed on third device,
receiving, at the first device from the third device, a first user input selecting one of the content object from the first set of additional hashtag-playlist content objects for inclusion in the sequence of content, and
responsive to receiving the first user input selecting one of the content object from the first set of additional hashtag-playlist content objects for inclusion in the sequence of content, adding the selected content object in the sequence of content and associated the selected content object with the hashtag-playlist identifier; and transmit at least one content object from the sequence of content for presentation to a user associated with the user account.

7. The apparatus of claim 6, wherein the processor is configured to execute the instructions to store the hashtag-playlist information by:
in response to a determination that the hashtag-playlist generation request message includes a source hashtag-playlist indicator, storing the information indicating the defined association for each content object from a plurality of content objects associated with a source hashtag-playlist indicated by the source hashtag-playlist indicator.

8. The apparatus of claim 6, wherein the processor is configured to execute the instructions to:
receive, from a fourth device via a third electronic communication link, a hashtag-playlist association request message, the hashtag-playlist association request message including the hashtag-playlist indicator, a content object indicator, and a second content curator indicator; and in response to a determination that previously generated hashtag-playlist association information indicating the defined association between the content object indicator, the second content curator indicator, and the hashtag-playlist indicator is unavailable, store hashtag-playlist association information indicating the defined association between the hashtag-playlist indicator, the content object indicator, and the second content curator indicator, wherein storing the hashtag-playlist association information includes generating the hashtag-playlist association information.

9. The apparatus of claim 6, wherein the content curator is the user, an identified user other than the user, a user from a plurality of users identified by the user, or a user from a plurality of users associated with an organization.

10. The apparatus of claim 6, wherein the processor is configured to execute the instructions to:
identify similar content objects wherein each respective content object from the similar content objects is identified based on a determined similarity metric value between the respective content object and the hashtag-playlist content objects; and
include at least one content object from the similar content objects in the sequence of content.

11. A non-transitory computer-readable storage medium, comprising executable instructions that, when executed by a processor, facilitate performance of operations, comprising:
receiving, at a first device from a second device via a first electronic communication link, a hashtag-playlist generation request message, the hashtag-playlist generation request message including a hashtag-playlist indicator and a first content curator indicator, the hashtag-playlist indicator identifying a hashtag-playlist, and the first content curator indicator indicating a first content curator;

in response to a determination that a previously generated hashtag-playlist corresponding to the hashtag-playlist indicator is unavailable, storing, by a processor of the first device in response to instructions stored on a non-transitory computer readable medium of the first device, hashtag-playlist information indicating an association between the hashtag-playlist indicator and the first content curator indicator, wherein storing the hashtag-playlist information includes generating the hashtag-playlist information;

receiving, at the first device from a third device via a second electronic communication link, a request for a sequence of content, wherein the request for the sequence of content includes the hashtag-playlist indicator and a user account indicator identifying a user account;

generating, by the processor in response to the instructions stored on the non-transitory computer readable medium, the sequence of content, wherein generating the sequence of content includes:
identifying hashtag-playlist content objects, wherein each respective content object from the hashtag-playlist content objects is identified based on information indicating a defined association between the respective content object and the hashtag-playlist identifier,
including at least one content object from the hashtag-playlist content objects in the sequence of content,
identifying a first set of additional hashtag-playlist content objects, wherein each respective content object from the first set of additional hashtag-playlist content objects is not associated with the hashtag-playlist identifier, causing the first set of additional hashtag-playlist content objects to be displayed on third device, receiving, at the first device from the third device, a first user input selecting one of the content object from the first set of additional hashtag-playlist content objects for inclusion in the sequence of content, and responsive to receiving the first user input selecting one of the content object from the first set of additional hashtag-playlist content objects for inclusion in the sequence of content, adding the selected content object in the sequence of content and associated the selected content object with the hashtag-playlist identifier; and transmitting at least one content object from the sequence of content for presentation to a user associated with the user account.

12. The non-transitory computer-readable storage medium of claim 11, wherein storing the hashtag-playlist information includes:

in response to a determination that the hashtag-playlist generation request message includes a source hashtag-playlist indicator, storing the information indicating the defined association for each content object from a plurality of content objects associated with a source hashtag-playlist indicated by the source hashtag-playlist indicator.

13. The non-transitory computer-readable storage medium of claim 11, further comprising:

receiving, at the first device from a fourth device via a third electronic communication link, a hashtag-playlist association request message, the hashtag-playlist association request message including the hashtag-playlist indicator, a content object indicator, and a second content curator indicator; and in response to a determination that previously generated hashtag-playlist association information indicating the defined association between the content object indicator, the second content curator indicator, and the hashtag-playlist indicator is unavailable, storing, by the processor of the first device in response to the instructions stored on the non-transitory computer readable medium of the first device, hashtag-playlist association information indicating the defined association between the hashtag-playlist indicator, the content object indicator, and the second content curator indicator, wherein storing the hashtag-playlist association information includes generating the hashtag-playlist association information.

14. The non-transitory computer-readable storage medium of claim 11, wherein the content curator is the user, an identified user other than the user, a user from a plurality of users identified by the user, or a user from a plurality of users associated with an organization.

15. The non-transitory computer-readable storage medium of claim 11, further comprising:

identifying similar content objects wherein each respective content object from the similar content objects is identified based on a determined similarity metric value between the respective content object and the hashtag-playlist content objects; and including at least one content object from the similar content objects in the sequence of content.

16. The method of claim 1, further comprising:

receiving, at the first device from the third device, a second user input requesting a second set of additional hashtag-playlist content objects, identifying the second set of additional hashtag-playlist content objects, wherein each respective content object from the second set of additional hashtag-playlist content objects is not associated with the hashtag-playlist identifier, and wherein the first set of additional hashtag-playlist content objects and different from the first set of additional hashtag-playlist content objects, and causing the second set of additional hashtag-playlist content objects to be displayed on third device.

* * * * *